United States Patent
Nordström et al.

(10) Patent No.: US 10,594,426 B2
(45) Date of Patent: Mar. 17, 2020

(54) COMMUNICATION DEVICE, NETWORK NODE, METHOD AND COMPUTER PROGRAM

(71) Applicant: Telefonaktiebolaget LM Ericsson (publ), Stockholm (SE)

(72) Inventors: Fredrik Nordström, Lund (SE); Maomao Chen, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/763,549

(22) PCT Filed: Oct. 3, 2016

(86) PCT No.: PCT/EP2016/073553
§ 371 (c)(1),
(2) Date: Mar. 27, 2018

(87) PCT Pub. No.: WO2017/060191
PCT Pub. Date: Apr. 13, 2017

(65) Prior Publication Data
US 2018/0278354 A1    Sep. 27, 2018

Related U.S. Application Data
(60) Provisional application No. 62/237,103, filed on Oct. 5, 2015.

(51) Int. Cl.
*H04J 11/00* (2006.01)
*H04W 72/04* (2009.01)
(Continued)

(52) U.S. Cl.
CPC .......... *H04J 11/005* (2013.01); *H04L 5/0048* (2013.01); *H04L 5/0073* (2013.01);
(Continued)

(58) Field of Classification Search
CPC ............................. H04J 11/005; H04L 5/0048
See application file for complete search history.

(56) References Cited

U.S. PATENT DOCUMENTS

| | | | |
|---|---|---|---|
| 2009/0016263 A1 | 1/2009 | Kishigami et al. | |
| 2011/0267937 A1* | 11/2011 | Yoo | H04J 11/005 370/201 |

(Continued)

FOREIGN PATENT DOCUMENTS

| | | |
|---|---|---|
| CN | 103155440 A | 6/2013 |
| CN | 103188745 A | 7/2013 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, pp. 1-302.

(Continued)

*Primary Examiner* — Robert C Scheibel
(74) *Attorney, Agent, or Firm* — Murphy, Bilak & Homiller, PLLC

(57) ABSTRACT

A method of a communication device arranged to operate in a cellular communication system is presented. The method comprises receiving a control symbol from a network node operating a cell of the cellular communication system and serving the communication device, determining interference situation for the control symbol, selecting an interference mitigation algorithm based on the determined interference, and performing the selected interference mitigation algorithm for the received control symbol. A communication device arranged to perform interference mitigation for received control symbols by the method, and a computer program for the communication device are also presented.

16 Claims, 7 Drawing Sheets

(51) Int. Cl.
*H04W 76/27* (2018.01)
*H04L 5/00* (2006.01)

(52) U.S. Cl.
CPC ....... *H04W 72/0406* (2013.01); *H04W 76/27* (2018.02); *H04J 2211/005* (2013.01)

(56) References Cited

U.S. PATENT DOCUMENTS

| | | | | |
|---|---|---|---|---|
| 2012/0108194 | A1* | 5/2012 | Lindqvist | H04B 7/0854 455/296 |
| 2013/0163529 | A1* | 6/2013 | Chen | H04W 72/082 370/329 |
| 2014/0010170 | A1* | 1/2014 | Das | H04L 5/0094 370/329 |
| 2014/0112262 | A1 | 4/2014 | Mallik et al. | |
| 2014/0128115 | A1 | 5/2014 | Siomina et al. | |
| 2014/0233457 | A1* | 8/2014 | Koutsimanis | H04J 11/005 370/328 |
| 2014/0241168 | A1 | 8/2014 | Merlin et al. | |
| 2014/0293890 | A1 | 10/2014 | Davydov et al. | |
| 2014/0321296 | A1* | 10/2014 | Balraj | H04L 5/0032 370/252 |
| 2015/0009903 | A1* | 1/2015 | Xue | H04W 48/16 370/329 |
| 2015/0092666 | A1* | 4/2015 | Wu | H04W 16/10 370/328 |
| 2015/0139004 | A1* | 5/2015 | Fodor | H04W 72/082 370/252 |
| 2015/0146679 | A1* | 5/2015 | Lindoff | H04B 1/7103 370/330 |
| 2015/0189526 | A1* | 7/2015 | Yang | H04W 72/085 370/252 |
| 2015/0358855 | A1* | 12/2015 | Yang | H04B 17/345 370/252 |
| 2016/0006521 | A1 | 1/2016 | Yoshimoto et al. | |
| 2016/0198486 | A1 | 7/2016 | Melzer et al. | |
| 2016/0242038 | A1 | 8/2016 | Lei | |
| 2017/0207898 | A1* | 7/2017 | Yang | H04J 11/00 |
| 2018/0041906 | A1* | 2/2018 | Jang | H04W 24/10 |

FOREIGN PATENT DOCUMENTS

| | | |
|---|---|---|
| CN | 104702540 A | 6/2015 |
| EP | 2869616 A1 | 5/2015 |
| EP | 2966885 A1 | 1/2016 |
| JP | 2015523021 A | 8/2015 |
| JP | 2015536611 A | 12/2015 |
| WO | 2013176589 A1 | 11/2013 |
| WO | 2014006109 A1 | 1/2014 |
| WO | 2014066109 A2 | 5/2014 |
| WO | 2014136620 A1 | 9/2014 |
| WO | 2015053670 A1 | 4/2015 |
| WO | 2015174800 A1 | 11/2015 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.12.0, Jun. 2015, pp. 1-357.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.6.0, Jun. 2015, pp. 1-449.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0 (Dec. 2015), Dec. 2015, pp. 1-507.

"3rd Generation Partnership Project; Technical Specification Group Radio Access Network; Evolved Universal Terrestrial Radio Access (E-UTRA); User Equipment (UE) radio transmission and reception (Release 13)", 3GPP TS 36.101 V13.1.0 (Oct. 2015), Oct. 2015, pp. 1-762.

"3rd Generation Partnership Project; Technical Specification Group Radio Access Network; Study on Network-Assisted Interference Cancellation and Suppression (NAIC) for LTE (Release 12)", 3GPP TR 36.866 V12.0.1, Mar. 2014, pp. 1-64.

"Consideration on interference model for control channels interference mitigation", 3GPP TSG-RAN WG4 Meeting #76bis; RF-155917; Sophia Antipolis, France, Oct. 12-16, 2015, pp. 1-6.

"Discussions on different candidate receivers for control channels interference mitigation", 3GPP TSG-RAN WG4 Meeting #76bis; R4-155916; Sophia Antipolis, France, Oct. 12-16, 2015, pp. 1-9.

"LS on the modification of CRS assistance information for CRS interference mitigation", 3GPP TSG-RAN WG4 Meeting #76bis; R4-156406; Sophia-Antipolis, France, Oct. 12-16, 2015, p. 1.

"New WI proposal: Interference mitigation for downlink control channels of LTE", 3GPP TSG RAN Meeting #68, RP-151107, Malmö, Sweden, Jun. 15-18, 2015, pp. 1-8.

"New Work Item proposal: Perf. Part: CRS Interference Mitigation for LTE Homogenous Deployments", 3GPP TSG RAN Meeting #66, RP-142263, Maui, Hawaii USA, Dec. 8-11, 2014, pp. 1-8.

"Performance results for different receiver types on different control channels", 3GPP TSG-RAN WG4 Meeting #76bis; R4-155918; Sophia Antipolis, France, Oct. 12-16, 2015, pp. 1-8.

"Test coverage and applicability rules for 4Rx capable UEs for demodulation and RRM tests", 3GPP TSG-RAN WG4 Meeting #76bis; R4-155909; Sophia Antipolis, France, Oct. 12-16, 2015, pp. 1-4.

"Test list with scenarios and scopes for control channels interference mitigation", 3GPP TSG-RAN WG4 Meeting #76bis; R4-155919; Sophia Antipolis, France, Oct. 12-16, 2015, pp. 1-8.

"UE capability and signaling related for control channels interference mitigation", 3GPP TSG-RAN WG4 Meeting #76bis; R4-155920; Sophia Antipolis, France, Oct. 12-16, 2015, pp. 1-3.

"New WI proposal: Interference mitigation for downlink control channels of LTE", 3GPP TSG RAN Meeting #68, RP-150751, revision of RP-150494, Malmö, Sweden, Jun. 15-18, 2015, pp. 1-7.

* cited by examiner

COMMUNICATION DEVICE, NETWORK NODE, METHOD AND COMPUTER PROGRAM

TECHNICAL FIELD

The present invention generally relates to a communication device, network node, method therefor, and computer program for implementing the method.

ABBREVIATIONS

Below, some of the abbreviations used in this disclosure are explained.

| Abbreviation | Explanation |
| --- | --- |
| 3GPP | Third generation partnership project |
| PBCH | Physical broadcast channel |
| OFDM | Orthogonal Frequency Division Multiplex |
| MIMO | Multiple input multiple output |
| HSDPA | High Speed Downlink Packet Access |
| LTE | Long term evolution |
| SIB | System information block |
| CRS | Cell-specific reference signal |
| RE | Resource element |
| ABS | Almost bland subframe |
| HARQ | Hybrid automatic repeat request |
| CRC | Cyclic redundancy check |
| NACK | non-acknowledgement |
| ACK | acknowledgement |
| UE | User Equipment |
| IM | Interference mitigation |
| IC | Interference cancellation |
| ICIC | Inter-cell interference control |
| FeICIC | Further enhanced ICIC |
| MMSE | Minimum mean square equaliser |
| IRC | Interference rejection combining |
| SC | Serving cell |
| NC | Neighbouring cell |
| CP | Cyclic prefix |
| PCell | Primary cell |
| SCell | Secondary cell |
| CQI | Channel quality information |
| TTI | Transmit Time Interval |
| EPDCCH | Enhanced PDCCH (sometimes written as ePDCCH) |
| PDCCH | Physical downlink control channel |
| PDSCH | Physical downlink data channel |
| PCFICH | Physical control format indicator channel |
| PHICH | Physical hybrid ARQ indicator channel |
| CFI | Control format indicator |
| RRM | Radio resource management |
| RLM | Radio link monitoring |
| RSRP | Reference Signal Received Power |
| RSRQ | Reference Signal Received Quality |
| CCH | Control channels |
| IE | Information element |
| AL | Aggregation level |

BACKGROUND

This disclosure is made in the context of LTE to provide the reader a tangible context, but the skilled reader will readily see the analogy with other technologies, where applicable.

The structure of transmission in LTE is organized in frames of 10 ms. One frame consists of ten equally sized subframes. A subframe is either 12 or 14 OFDM symbols, depending on if normal or long cyclic prefix is used. The first symbol(s) in a subframe is control symbols. There can be 1, 2 or 3 control symbols depending need for control signalling. For small bandwidth there can be 2 to 4 symbols, and for some specific cases there is not allowed to have many symbols.

The control signalling can also be done by using PBCH or in the data region as ePDCCH, SIB or dedicated RRM signalling, all these are outside scope of this invention.

The system can be configured with 1, 2 or 4 CRS ports. The CRS are used for channel estimation, synchronization and estimation of channel characteristics. For 1 and 2 CRS ports there are CRSes in 1st, 5th, 8th, and 12th symbol (for normal subframe, non-MBSF and up 2 CRS ports). For 4 CRS ports there are also CRSes in 2nd and 9th symbol. The CRSes in first and second symbol hence share the same time symbols as control signals. The positions in frequency of CRS are every 6th RE per CRS port. CRS port 0 and port 1 share the same symbol but port 1 is shifted three subcarrier compared to port 0, the same goes for port 2 and port 3. Then there is also a shift in subcarrier that depends on cell id of the cell, and the shift is cell id modulo 6.

There are three types of control signals transmitted in the control region, PCFICH, PHICH and PDCCH. The control data is transmitted in one or several Resource Elements Groups (REG). A REG is spread over 4 or 6 REs, but always contain 4 REs carrying payload. A REG is spread over 6 REs in the case there is CRSes in the symbol, the extra REs are reserved for CRS.

The control data is transmitted, for one CRS port, is one modulation symbol per RE. The control data is Alamouti coded when there are 2 or 4 CRS ports. For Alamouti coding two modulation symbols are orthogonally spread over 2 REs. This also holds in LTE for 4 CRS, but here CRS port 0 and CRS port 2 is used in pair, and CRS port 1 and CRS port 3 is used as a second pair.

The existing CRS-IC assistant information is defined for eICIC scenarios from 3GPP specification TS 36.331, v10.5.0. It is defined for CRS-IC in ABS subframe in Rel-11 in 36.331, v. 11.12.0 as:

"neighCellsCRS-Info: This field contains assistance information, concerning the primary frequency, used by the UE to mitigate interference from CRS while performing RRM/RLM/CSI measurement or data demodulation. When the received CRS assistance information is for a cell with CRS colliding with that of the CRS of the cell to measure, the UE may use the CRS assistance information to mitigate CRS interference (as specified in TS 36.101) on the subframes indicated by measSubframePatternPCell, measSubframePatternConfigNeigh, csi-MeasSubframeSet1 if configured, and the CSI subframe set 1 if csi-MeasSubframeSets-r12 is configured. Furthermore, the UE may use CRS assistance information to mitigate CRS interference from the cells in the IE for the demodulation purpose as specified in TS 36.101."

Further, according to Rel-12, TS 36.331, v. 12.6.0, EUTRAN does not configure neighCellsCRS-Info-r11 if eimta-MainConfigPCell-r12 is configured. This is there stated as:

```
"CRS-AssistanceInfoList-r11 ::=SEQUENCE (SIZE (1..maxCellReport)) OF
CRS-AssistanceInfo-r11
   CRS-AssistanceInfo-r11 ::= SEQUENCE {
      physCellId-r11        PhysCellId,
```

```
    antennaPortsCount-r11   ENUMERATED {an1, an2, an4, spare1},
    mbsfn-SubframeConfigList-r11      MBSFN-SubframeConfigList,
    ...
}"
```

Current demodulation and interference suppression methods for control channel region in LTE use the same method for all control symbols. This implies that a full potential for reception may not be used. It is therefore a desire to provide a receiver with improved capability, and to provide an approach which may enhance the systems overall capability.

SUMMARY

According to a first aspect, there is provided a method of a communication device arranged to operate in a cellular communication system. The method comprises receiving a control symbol from a network node operating a cell of the cellular communication system and serving the communication device, determining interference situation for the control symbol, selecting an interference mitigation algorithm based on the determined interference, and performing the selected interference mitigation algorithm for the received control symbol.

The determining of the interference situation may include determining whether neighbouring interfering cells are time aligned with the cell providing the control signal.

The determining of the interference situation may include determining whether the control signal collides in time and frequency with control signals provided in neighbouring interfering cells.

The determining of the interference situation may include determining whether a cell-specific reference symbol assistant information is provided by the serving network node.

The determining of the interference situation may include determining a structure of the provision of the control symbol. The structure may include which orthogonal frequency division multiplex symbol the control symbol is provided in. The structure may include how many ports for control symbols that are used for the provision of the control symbol.

The method may comprise determining interference mitigation capabilities for control symbols, and transmitting information about the determined interference mitigation capabilities to a network node of the cellular communication system. The determining of the interference mitigation capabilities may be performed once for static interference mitigation capabilities. The determining of the interference mitigation capabilities may be performed upon an interference mitigation capabilities determination event. The interference mitigation capabilities determination event may be any one of when the communication device has determined any change which has impact on the interference mitigation capabilities, a periodically interference mitigation capabilities determination event, an occasion where the communication device is to send uplink feedback information, upon receiving a request from a network node to transmit interference mitigation capabilities, and any combination thereof.

The transmitting of the information about the determined interference mitigation capabilities may comprise transmitting the information in a higher layer signalling. The higher layer signalling may be made via any one of an RRC message to the network node and a MAC message.

The transmitting of the information about the determined interference mitigation capabilities may comprise use, for indicating the information related to the determined parameter for per carrier to the network node, of any one of unused bits, unused code words, unused fields, control space, bit pattern or bit combinations, and any combination thereof. The unused bits may be any set of available bits in an uplink control channel that are not used for indication about any uplink transmission parameters.

According to a second aspect, there is provided a communication device arranged to operate in a cellular communication system and receive control symbols from a network node operating a cell of the cellular communication system and serving the communication device. The communication device is arranged to perform interference mitigation for received control symbols by a method according to the first aspect.

According to a third aspect, there is provided a computer program comprising instructions which, when executed on a processor of a communication device, causes the communication device to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
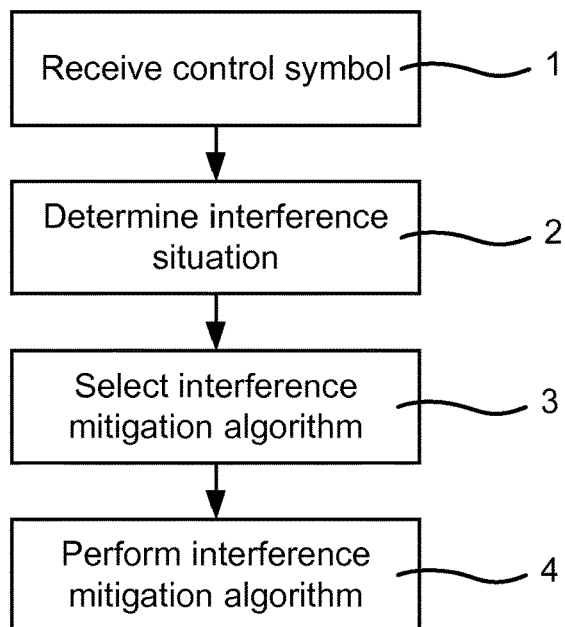
FIG. 1 is a flow chart illustrating a method according to an embodiment

If the neighbouring cells (NC) are time unsynchronized the interference will be assumed unstructured or possible structure has to be blindly detected. However, if the serving cell (SC) and neighbouring cells share the same start of subframe (within approximately CP) it means that one or several control symbols will overlap in time, the cells are considered synchronized. Synchronized cells are always true in TDD deployment and for FDD deployment if e.g. advanced interference handling is used. The control symbol overlap depends on how many control symbols each cell has. The SC control region size is read from SC PCFICH. The NC control region size can either be read from NC PCFICH or blindly detected. A REG can either be allocated or not allocated.

First we consider an OFDM symbol where neither SC nor NC have CRS. In that case a REG is spread over 4 REs and REGs from SC and NC will overlap. For 1 CRS port on both SC and NC, the interference will be independent between REs. For 2 CRS ports on both SC and NC, the useful data and interference covering 2 overlapping REs and both are Alamouti coded. For 4 CRS ports the Alamouti coding is spread over 4 REs as of 2 independent Alamouti pairs, where the first two REs are connected by CRS port 0 and port 2 and the other 2 REs are connected to CRS port 1 and port 3. For interference on 2 REs which is a pair of Alamouti coded symbols, there is a dependency between the REs which can be exploited when demodulating SC.

If the OFDM symbol from both SC and NC contain CRSes and the CRS collide, i.e. occupy same subcarriers, the interference on control channels will be the same as in previous paragraph. If the OFDM symbol contains CRS and CRS is not colliding, a NC REG data REs will both overlap with SC REG data REs and SC CRS. The SC CRS will collide with NC REG data REs. For the case of one CRS port there will not be any dependency between REs. For two CRS ports the dependency will over three REs due to Alamouti transmission. For four CRS ports the dependency will be over six REs.

A multitude of possible interference suppression algorithms may come into question. Some examples are presented below (short naming within parentheses will be used for referring to the algorithms):

Non-parametric MMSE-IRC (IRC), wherein the UE uses residuals at CRS to estimate the interference and noise covariance matrix.

Parametric MMSE-IRC over one RE (EIRC1), wherein the UE estimates the neighbouring cells channels and from the estimates build up the interference and noise covariance matrix. The matrix should reflect the interference structure seen over one RE.

Parametric MMSE-IRC over two REs (EIRC2). This is similar to EIRC1, but the matrix becomes twice as large, since it should reflect the interference structure seen over 2 REs. The interference matrix in this case should capture that the same modulation symbols are transmitted over 2 REs. This receiver can take advantage of the dependency between REs that is the results of Alamouti transmission.

Parametric MMSE-IRC over three REs (EIRC3). This is similar to EIRC1, but the matrix becomes three times as large since it should reflect the interference structure seen over 3 REs. The interference matrix in this case should capture that the same modulation symbols are transmitted over 2 REs plus one RE contain CRS. This receiver can take advantage of the dependency between REs that is the results of Alamouti transmission in case of non-colliding CRS between SC and NC. In this case the dependency will cover 3 REs.

Parametric MMSE-IRC over four or six REs (EIRC4). This is similar to EIRC1, but the matrix becomes four or six times as large since it should reflect the interference structure seen over 4 or 6 REs. This may be needed when either SC or NC has 4 CRS ports and the other has 2 CRS ports. In this case the dependency between REs is spread over 4 or 6 REs, and is 4 REs when colliding CRS and 6 when non-colliding CRS.

CRS IM (CRS-IC). This is to use CRS-IC when there is CRS assistant information provided. The existing CRS assistant information is from Rel-11, as defined in 3GPP TS 36.331. An approach demonstrated in RP-142263, with title "CDR Interference Mitigation for LTE Homogeneous Deployments", aims at extending the usage of such signalling to normal subframes under all conditions including both PCell and SCells.

Maximum likelihood (ML). This algorithm can be used for any scenario with different setups.

Combinations of the methods above may be employed. For example, CRS-IC may be combined with all the other type of advanced receiver approaches demonstrated above.

Different receiver types may be employed for PHICH. For example, MMSE-IRC and EIRC1 together with CRS-IC may be used.

Different receiver types may be employed for ePDCCH. For example, for ePDCCH, MMSE-IRC together with CRS-IC may be used.

The choice of algorithm for control channels, e.g. PDCCH, PCFICH and PHICH, will now be discussed. All the following algorithms assume that the OFDM symbols which are used for control channels are the same between serving cell and neighbouring cells. In case the CFI is not aligned between serving cells and neighbouring cells, then preferably only MMSE-IRC is used.

Depending on knowledge and time synchronization of the neighbouring cells, different IM algorithms are used. Below, some examples of configurations for different setups are given, other setups are not excluded. Two CRS ports are assumed if nothing else is stated.

In case of non-synchronized cells, IRC may be used.

In case of synchronized cells and colliding CRS, EIRC2 may be used.

In case of synchronized cells and non-colliding CRS in first OFDM symbol, EIRC3 or a combination of EIRC1 and CRS-IC may be used.

In case of synchronized cells and non-colliding CRS, when 4 CRS ports are present, and second (if control symbol) OFDM symbol exists, EIRC3 or a combination of EIRC1 and CRS-IC may be used.

In case of synchronized cells and non-colliding CRS and second (if control symbol) OFDM symbol exists, EIRC2 may be used.

In case of synchronized cells and non-colliding CRS and third/fourth (if control symbol) OFDM symbol exist, EIRC4 may be used.

Different categorisations of cases and the respective preferred IM algorithms may be formed differently.

For other control channels, a similar structure of preferred IM algorithms for different cases may be set up. Some examples will be given here. All the following algorithms assume the number of OFDM symbols used for control channels are the same between serving cell and neighbouring cells. In case the CFI is not aligned between serving cells and neighbouring cells, then preferably only MMSE-IRC is used for control symbols in serving cell which collide with non-control symbols in neighbouring cell and one of the above algorithm for OFDM symbols which, for both SC and NC, carry control signals.

For PCFICH/PHICH when only one RE is available, since the channel PCFICH and PHICH can follow same chart as for PDCCH for the choice of algorithm, the choice may depend on if the CRS-IC assistant information is received or not. For example, EIRC1 is used when no CRS-IC assistant information is received, and EIRC1 together with CRS-IC is used when CRS-IC assistant information is received.

For ePDCCH when the interference varies very often among PDSCH data or ePDCCH, it is difficult to track such interference characteristic. For this case, MMSE-IRC may be used.

One or more of the embodiments demonstrated above provide an algorithm for the UE to employ based on the particular case. Control channel interference, e.g. NC PDCCH, PCFICH and PHICH, mitigation may thus depend on the network deployment, e.g. if it is a synchronous or asynchronous network in relation to neighbouring cell(s), if the CRS assistant info is received or not, if it is colliding CRS or non-colliding CRS, based on the OFDM symbol indexes, based on the different control channels, etc. The goal of such algorithms selection is to use the potential for improved control channel decoding at the UE side. The above demonstrated approaches provide for better receiver and demodulation performance for control channels.

FIG. 1 is a flow chart illustrating a method according to an embodiment. The method is of a communication device arranged to operate in a cellular communication system. The method comprises receiving 1 a control symbol from a network node operating a cell of the cellular communication system and serving the communication device. An interference situation is determined 2 for the control symbol. Based on the determined interference situation an interference mitigation algorithm is selected 3, and the selected interference mitigation algorithm is performed 4 for the received control symbol.

Figure 2:
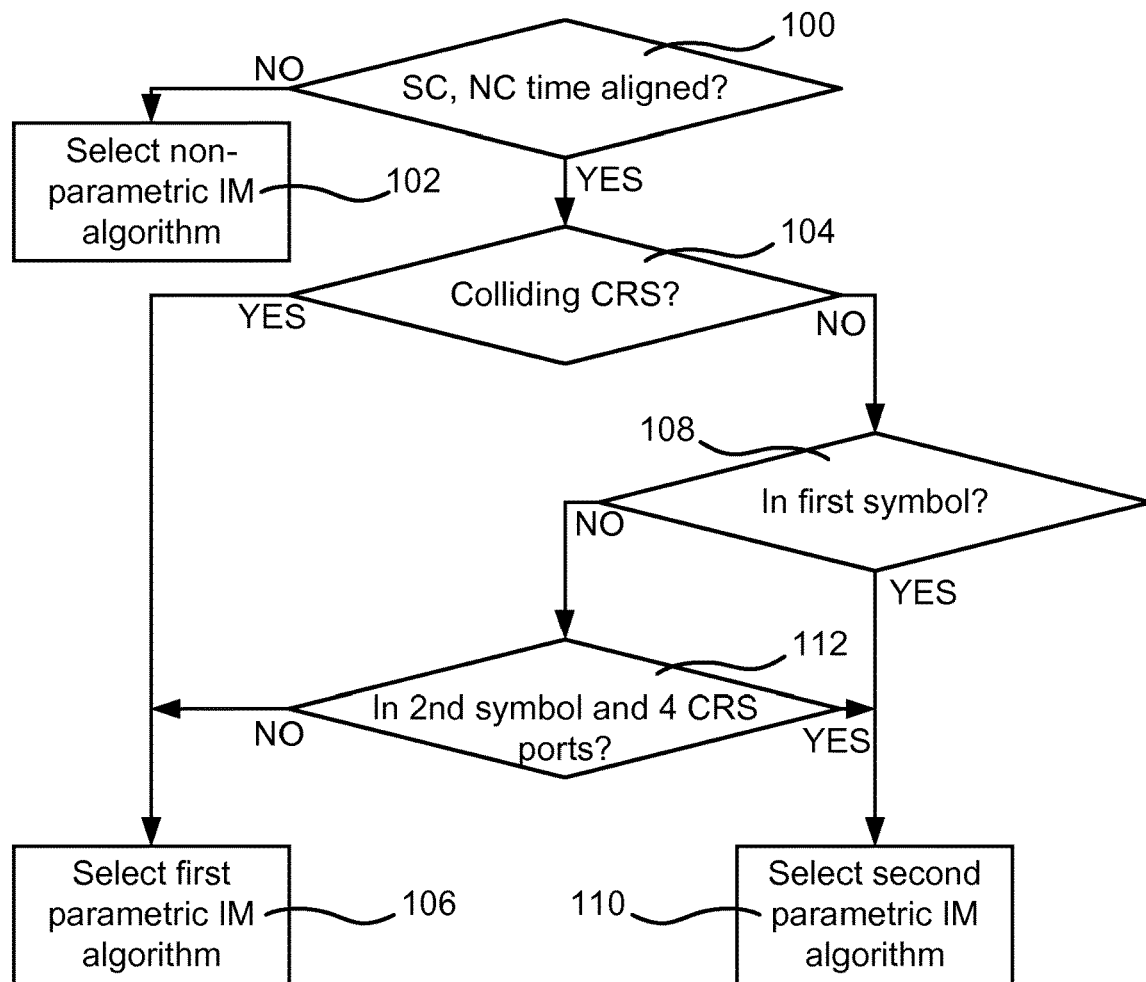
FIG. 2 is a flow chart illustrating a method according to an embodiment.

FIG. 2 is a flow chart illustrating a method according to an embodiment. It is checked 100 whether the SC and NC are time aligned. If not, a non-parametric IM algorithm is selected 102, e.g. IRC as demonstrated above. If the SC and NC are time aligned, it is checked 104 whether there are colliding CRSes. If there are, a first parametric IM algorithm, e.g. EIRC2, is selected 106. If no colliding CRSes are present, it is checked 108 whether control symbol is in first OFDM symbol. If it is, a second parametric IM algorithm, e.g. EIRC3, is selected 110. If not, it is checked 112 whether control symbol is in second OFDM symbol and 4 CRS ports are present. If so, the selection 110 of the second parametric IM algorithm is made. If not, the selection 106 of the first parametric IM algorithm is made.

Figure 3:
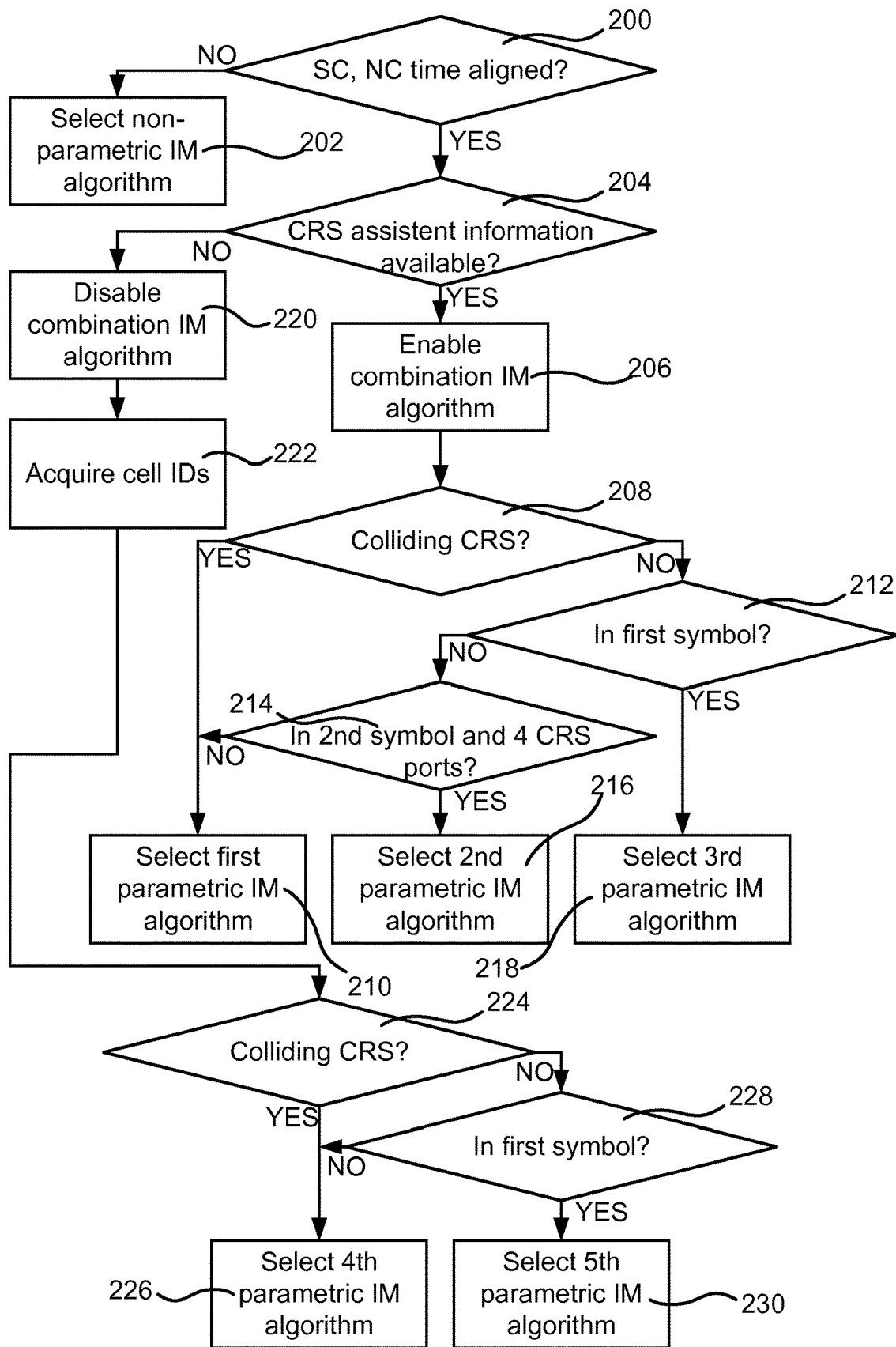
FIG. 3 is a flow chart illustrating a method according to an embodiment.

FIG. 3 is a flow chart illustrating a method according to an embodiment. It is checked 200 whether the SC and NC are time aligned, e.g. within CP window. If not aligned, a non-parametric IM algorithm, such as IRC, is selected 202. If they are time aligned, it is checked 204 whether CRS assistant information is available. If it is, an IM algorithm to be combined with another IM algorithm, e.g. the CRS-IC algorithm, is enabled 206, which then may be combined with a further selected IM algorithm, as will be understood from the following. It is further checked 208 whether CRSes are colliding, and if they are, a first parametric IM algorithm, e.g. EIRC2, is selected 210 as IM algorithm to be combined with the CRS-IC algorithm. If not colliding, it is checked 212 whether control symbol is in first OFDM symbol. If it is not, it is further checked 214 whether the control symbol is in second OFDM symbol and whether 4 CRS ports are present. If so, a second parametric IM algorithm, e.g. EIRC4, is selected 216 as IM algorithm to be combined with e.g. the CRS-IC algorithm. If not, the selection 210 of the first parametric IM algorithm, e.g. EIRC2, to be combined with e.g. the CRS-IC algorithm is made. If the control symbol is in first OFDM symbol, a third parametric IM algorithm, e.g. EIRC3, is selected 218 as IM algorithm to be combined with e.g. the CRS-IC algorithm.

If no CRS assistant information is available, the CRS-IC algorithm is disabled 220. Cell identification of dominant NCs is acquired 222, e.g. first two dominant NCs, which may be acquired from cell search mechanism. It is then checked 224 whether there are colliding CRSes. If there are, a fourth IM algorithm, e.g. EIRC2, is selected 226 as IM algorithm. If no colliding CRSes, it is checked 228 whether control symbol is in first OFDM symbol. If so, a fifth parametric IM algorithm, e.g. EIRC1, is selected 230 as IM algorithm. If not, the selection 226 of the fourth parametric IM algorithm, e.g. EIRC2, is made.

Here, it can be seen that the second and fourth parametric IM algorithms given as examples are the same, but used with or without the combination with the combining IM algorithm enabled/disabled 206/220 in the method. This may be applied also for other algorithms where found suitable.

Figure 4:
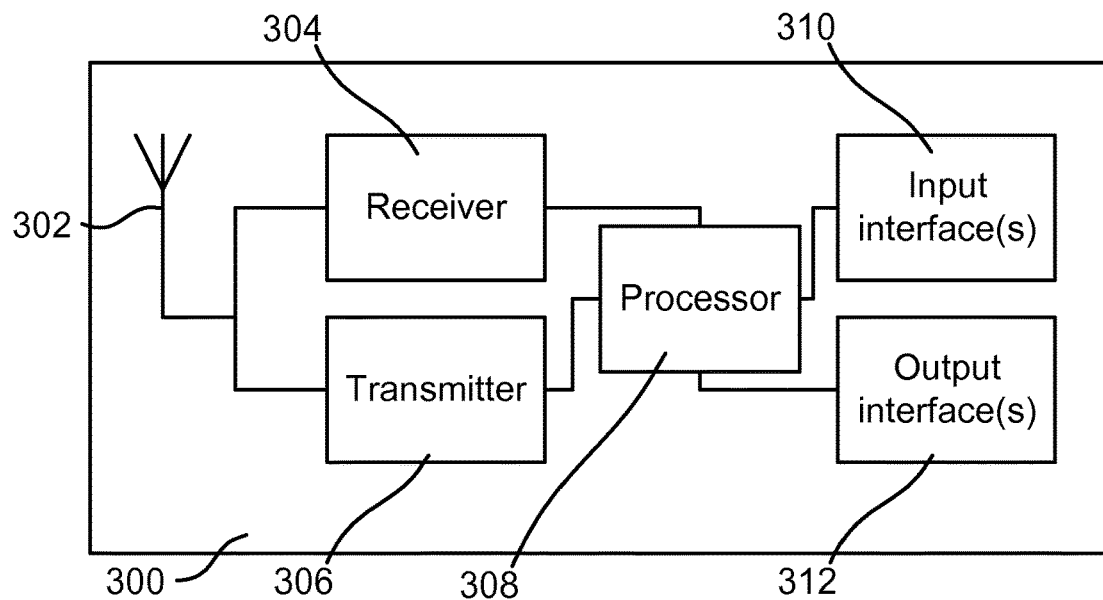
FIG. 4 is a block diagram schematically illustrating a communication device according to an embodiment.

FIG. 4 is a block diagram schematically illustrating a communication device 300 according to an embodiment. The communication device, e.g. a UE, comprises an antenna arrangement 302, a receiver 304 connected to the antenna arrangement 302, a transmitter 306 connected to the antenna arrangement 302, a processing element 308 which may comprise one or more circuits, one or more input interfaces 310 and one or more output interfaces 312. The interfaces 310, 312 can be user interfaces and/or signal interfaces, e.g. electrical or optical. The UE 300 is arranged to operate in a cellular communication network. In particular, by the processing element 308 the UE may be arranged to perform the embodiments demonstrated above and with reference to FIGS. 1 to 3, wherein the UE 300 may be capable of efficiently operating in a cellular communication network and receive control signals for applying selected IM algorithms as demonstrated above in order to offer wireless coverage in an environment with a wide variety of wireless coverage zones, ranging from an open outdoor environment to office buildings, homes, and underground areas. The processing element 308 can also fulfill a multitude of tasks, ranging from signal processing to enable reception and transmission since it is connected to the receiver 304 and transmitter 306, executing applications, controlling the interfaces 310, 312, etc.

Figure 5:
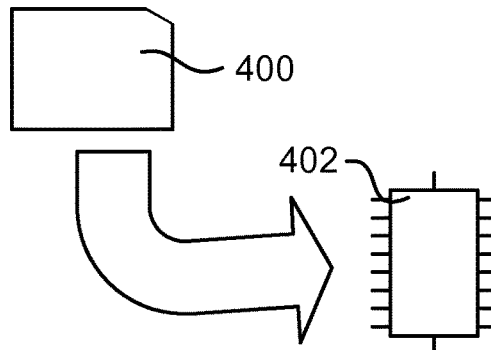
FIG. 5 schematically illustrates a computer-readable medium and a processing device.

The methods demonstrated above are suitable for implementation with aid of processing means, such as computers and/or processors, especially for the case where the processing element 308 demonstrated above comprises a processor handling IM. Therefore, there is provided computer programs, comprising instructions arranged to cause the processing means, processor, or computer to perform the steps of any of the methods according to any of the embodiments described with reference to FIGS. 1 to 3. The computer programs preferably comprise program code which is stored on a computer readable medium 400, as illustrated in FIG. 5, which can be loaded and executed by a processing means, processor, or computer 402 to cause it to perform the methods, respectively, according to embodiments of the present invention, preferably as any of the embodiments described with reference to FIGS. 1 to 3. The processor 402 and computer program product 400 can be arranged to execute the program code sequentially where actions of the any of the methods are performed stepwise. The processing means, processor, or computer 402 is preferably what normally is referred to as an embedded system. Thus, the depicted computer readable medium 400 and processor 402 in FIG. 5 should be construed to be for illustrative purposes only to provide understanding of the principle, and not to be construed as any direct illustration of the elements.

Advanced receivers of communication devices, e.g. UEs, with capability of interference mitigations for control channels including PCFICH, PDCCH, PHICH and ePDCCH can provide much better performance in terms of BLER under the same SINR compared with legacy receivers without such capability. An example of such advanced receiver is one as demonstrated above which has not only the capability of an advanced IM algorithm, but also the capability to select a promising algorithm among several. Another example of such advanced receiver is a receiver utilizing one IM algorithm that is fairly efficient for most cases. Other examples may be contemplated in light of the above given examples.

Such advanced capabilities are unknown for the network node serving the communication device, so even with the feature from network node to adjust power for different users or user groups within the cell in order to keep the UEs within the cell coverage is not using the full potential. This is because the network node cannot really distinguish the UE with more advanced receiver capability from a UE with less advanced receiver capability, e.g. legacy UEs. Here, it can be realized that the network node cannot adjust or provide the same power even when the UE is within the coverage with good performance and utilize the full potential.

It is therefore suggested by this disclosure to provide features of the UE and the network node such that this potential is utilized.

Consider a UE capable of interference mitigation on different channel channels, and that it reports its capability in either a combined way of indicating all type of advanced receiver in one or a separated way to indicate different receiver type for different control channels for different carriers etc. Then the network node utilizes such information to adjust the power level (and/or aggregation level for PDCCH) for all control channels in a combined manner or for different control channels in separated manners for different carriers as well. Also depending on the UE capability of CRS-IC, the network node could decide to send such CRS-assistant information or not to the UE. It is therefore suggested an approach for the UE of obtaining information about its different capabilities with different receiver types for different control channels and providing that information to the network node. It is also suggested an approach of the network node for using information about UE receiver capability for control channels for radio operation tasks.

By such approaches, the communication system through the network node can improve its handling of the DL transmit power and/or aggregation level on for transmitting the DL control channels and thereby limit the system performance loss compared with a legacy approach. This in turn enables the communication system to achieve a higher system capacity and throughput.

A multitude of possible interference suppression algorithms exist. Some examples are presented below (short naming within parentheses will be used for referring to the algorithms):

Non-parametric MMSE-IRC (IRC), wherein the UE uses residuals at CRS to estimate the interference and noise covariance matrix.

Parametric MMSE-IRC over one RE (EIRC1), wherein the UE estimates the neighbouring cells channels and from the estimates build up the interference and noise covariance matrix. The matrix should reflect the interference structure seen over one RE.

Parametric MMSE-IRC over two REs (EIRC2). This is similar to EIRC1, but the matrix becomes twice as large, since it should reflect the interference structure seen over 2 REs. The interference matrix in this case should capture that the same modulation symbols are transmitted over 2 REs. This receiver can take advantage of the dependency between REs that is the results of Alamouti transmission.

Parametric MMSE-IRC over three REs (EIRC3). This is similar to EIRC1, but the matrix becomes three times as large since it should reflect the interference structure seen over 3 REs. The interference matrix in this case should capture that the same modulation symbols are transmitted over 2 REs plus one RE contain CRS. This receiver can take advantage of the dependency between REs that is the results of Alamouti transmission in case of non-colliding CRS between SC and NC. In this case the dependency will cover 3 REs.

Parametric MMSE-IRC over four or six REs (EIRC4). This is similar to EIRC1, but the matrix becomes four or six times as large since it should reflect the interference structure seen over 4 or 6 REs. This may be needed when either SC or NC has 4 CRS ports and the other has 2 CRS ports. In this case the dependency between REs is spread over 4 or 6 REs, and is 4 REs when colliding CRS and 6 when non-colliding CRS.

CRS IM (CRS-IC). This is to use CRS-IC when there is CRS assistant information provided. The existing CRS assistant information is from Rel-11, as defined in 3GPP TS 36.331. An approach demonstrated in RP-142263, with title "CDR Interference Mitigation for LTE Homogeneous Deployments", aims at extending the usage of such signalling to normal subframes under all conditions including both PCell and SCells.

Maximum likelihood (ML). This algorithm can be used for any scenario with different setups.

Combinations of the methods above may be employed. For example, CRS-IC may be combined with all the other type of advanced receiver approaches demonstrated above.

Different receiver types may be employed for PHICH. For example, MMSE-IRC and EIRC1 together with CRS-IC may be used.

Different receiver types may be employed for ePDCCH. For example, for ePDCCH, MMSE-IRC together with CRS-IC may be used.

The UE determines its capability, which may be made dynamically, e.g. depending on available power and processing capabilities in the specific situation, or statically, i.e. the capabilities are fixed due to the construction of the UE. Information on the determined capability is provided to network node. Thus, a UE may transmit information related to the UE capability for different receiver types for different control channels per carrier, as described above, to one or more network nodes, e.g. first network node, second network node. The UE capability can be taken as one combined value with all control channels included as one bit indicating the interference mitigation capability, or it can be taken separately as capability for each control channel with different receiver types standing for different capabilities. Other suitable signalling structures may also be considered.

The capability may be taken as a constant value from the UE, i.e. statically and it only needs to be signalled once and do not vary over time, or it can be dynamic. The dynamic reporting may be arranged in different ways. For example, the UE may report the information proactively or autonomously whenever the UE determines any change in the value of parameter, or periodically or whenever the UE sends uplink feedback information, e.g. HARQ feedback, measurement report, etc. The UE may report the information upon receiving a request from the first or the second network node to transmit the information related to the value of parameter. The UE may be requested by the first or the second network node to report the information only if there is any change in the value of parameter for per carrier, with respect to the previously determined value of the parameter for per carrier.

The UE may report the said information by using any of the following mechanisms:
  In a first type of reporting mechanism, the UE may transmit the information in a higher layer signalling such as via an RRC message to the first network node or to the second network node. Such information may also be reported in a MAC message.
  In a second type of reporting mechanism, the UE may also use the unused bits or code words or fields or control space or bit pattern or bit combinations (aka spared, reserved, redundant bits or code words or control space or bit pattern or bit combinations, etc.) for indicating the information related to the determined parameter for per carrier to the first or the second network node. Typically using this mechanism, the UE sends the determined information to the first network node, e.g. to the serving base station. The unused bits herein mean any set of available bits in an uplink control channel that are not used for indicating the UE about any of uplink transmission parameters, e.g. are not used for indicating uplink feedback information such as CSI related information.

The network node uses information about UE receiver capability for control channels for radio operation tasks. The network node uses the obtained information related to the one or more parameters for performing one or more radio operation tasks. Examples of radio operational or radio resource management tasks are:
  Adaptation of transmit power on DL control channels. When the UE is indicating the (advanced) capability of interference mitigation, then the network node may use a lower power level for transmitting the control channels (e.g. PDCCH). Or if there are several UEs within the cells with same advanced capability of interference mitigation of control channels the network node could also use a lower power level for all related control channels, e.g. PDCCH, PCFICH, PHICH, ePDCCH, etc. Reducing the transmit power level will both reduce power consumption of transmission and also reduced interference to other nodes.
  Adaptation of aggregation level on PDCCH/PCFICH. When the UE is indicating the (advanced) capability of interference mitigation then the network node may use a lower aggregation level for transmitting the control channels (e.g. PDCCH). This can lead to that more users can be scheduled in the control region, or that the control region can be made smaller and the spared resource can be used for data transmission.
  Transmitting CRS assistant info to UE. The network node may also signal the CRS assistant information to the UE depending on the UE capability of different receiver types for different control channels.
  Transmitting information to other network nodes. The network node may also signal the information related to one or more radio operation tasks performed by the network node to another network node. For example, the first network node may send it to the second network node and/or to even a third network node, e.g. neighbouring base station such as by serving eNode B to neighbouring eNode B over X2 interface in LTE, etc. The receiving network node may use the received information for one or more radio tasks. These can be for example to adapt control region size to simplify UE interference mitigation, adapt power level in the control region to fit commonly used power level model used by UEs or use higher power levels than commonly used since UEs can mitigate the interference.

Figure 6:
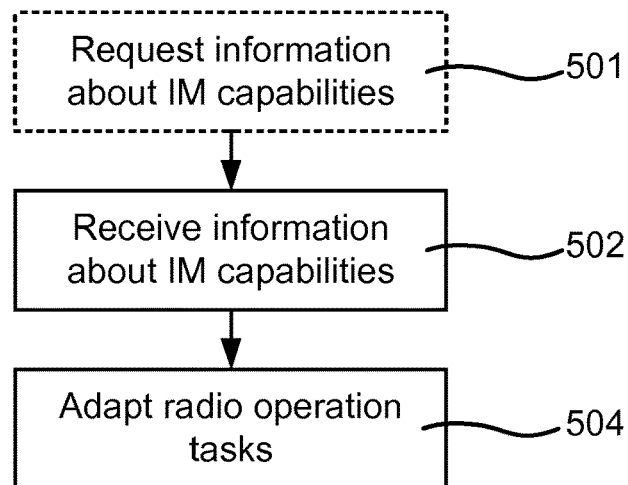
FIG. 6 is a flow chart illustrating a method of a network node according to an embodiment.

FIG. 6 is a flow chart illustrating a method of a network node according to an example. The method comprises receiving 502, from a communication device operating in the cellular communication system, information about determined interference mitigation capabilities of the communication device for control symbols, and adapting 504 how one or more radio operation tasks is performed based on the received information. Optionally, the method may include that a request for information about IM capabilities is transmitted 501 to the communication device such that the information about IM capabilities can be received 502 on demand. The adapting of performing the one or more radio operation tasks may for example include adapting transmit power on DL control channels, adapting aggregation level on PDCCH, adapting PCFICH, transmitting CRS assistant info to UE or transmitting information to other network nodes, or any combination thereof. The receiving the information about determined IM capabilities of the communication device for control symbols may be received in a higher layer signalling, e.g. via an RRC message or a MAC message. The receiving of the information about the determined IM capabilities, indicating the information related to the determined parameter for per carrier, may made in unused bits, unused code words, unused fields, control space, bit pattern or bit combinations, or in any combination thereof. The unused bits may be any set of available bits in an uplink control channel that are not used for indication about any uplink transmission parameters.

The reporting communication device may capable of an IM algorithm selection method as demonstrated above. This per se may be considered a particular IM capability. The receiving 502 of information about the determined IM capabilities may thus include receiving information about the communication device's capabilities in that sense.

Figure 7:
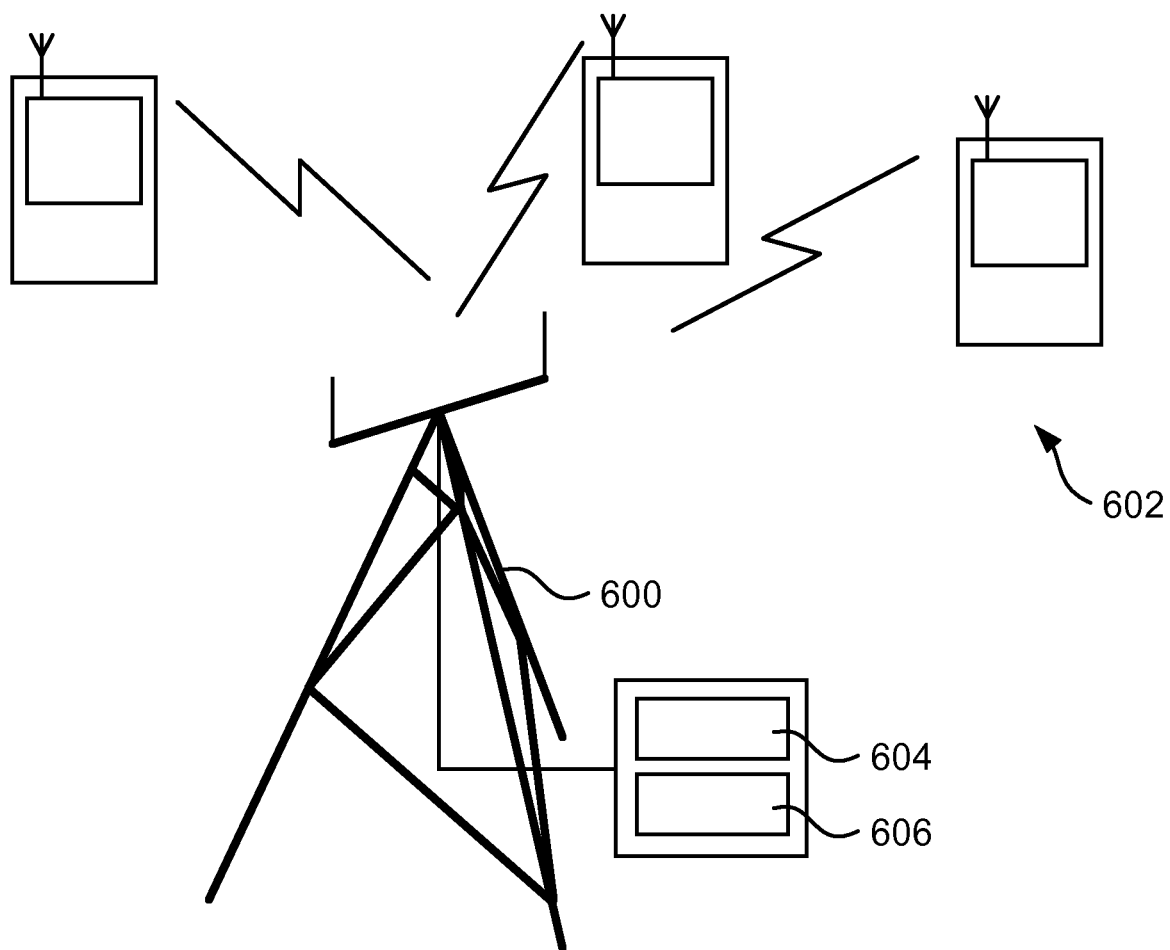
FIG. 7 illustrates a cellular network.

FIG. 7 illustrates a cellular network comprising a network node 600, e.g. an eNodeB, for wireless access operating in the cellular network arranged for serving wireless communication devices 602, i.e. communication devices as of any of the embodiments demonstrated above. The network node 600 is arranged to operate according to any of the approaches or combination of approaches as demonstrated above. The network node 600 thus receives information about IM capabilities of the communication devices 602 and adapts its radio operation tasks based thereon. The network node may comprise transceiver elements 604 and processing elements 606 for performing the above demonstrated approaches.

Figure 8:
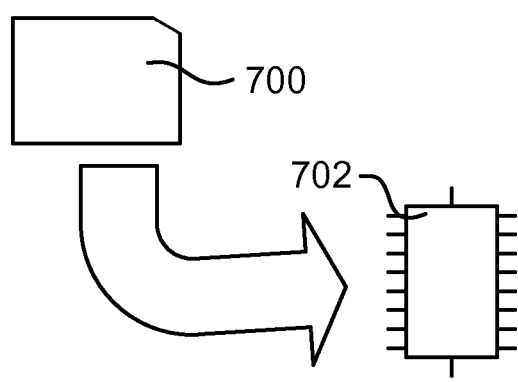
FIG. 8 schematically illustrates a computer-readable medium and a processing device.

The methods demonstrated above are suitable for implementation with aid of processing means, such as computers and/or processors, especially for the case where the processing element 606 demonstrated above comprises a processor adaptation of radio operation tasks. Therefore, there is provided computer programs, comprising instructions arranged to cause the processing means, processor, or computer to perform the steps of any of the methods according to any of the examples described with reference to FIG. 6. The computer programs preferably comprises program code which is stored on a computer readable medium 700, as illustrated in FIG. 8, which can be loaded and executed by a processing means, processor, or computer 702 to cause it to perform the methods, respectively, according to examples of the present disclosure, preferably as any of the examples described with reference to FIG. 6. The processor 702 and computer program product 700 can be arranged to execute the program code sequentially where actions of the any of the methods are performed stepwise. The processing means, processor, or computer 702 is preferably what normally is referred to as an embedded system. Thus, the depicted computer readable medium 700 and processor 702 in FIG. 8 should be construed to be for illustrative purposes only to provide understanding of the principle, and not to be construed as any direct illustration of the elements.

Figure 9:
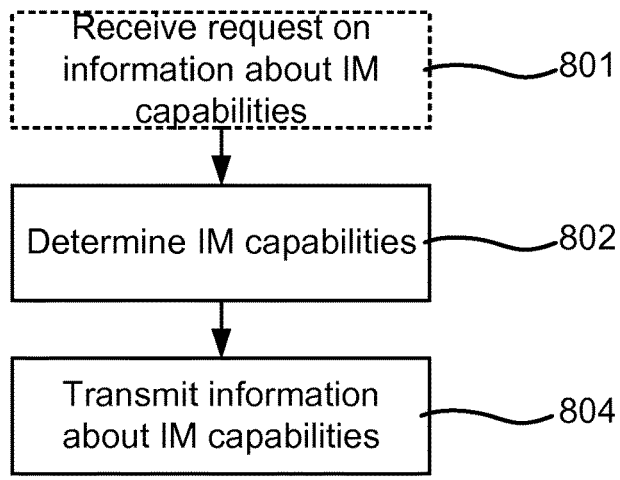
FIG. 9 is a flow chart illustrating a method of a communication device according to an embodiment.

FIG. 9 is a flow chart illustrating a method of a communication device according to an embodiment. The method may typically be applied in combination with any of the methods demonstrated with reference to FIGS. 1 to 3. The method comprises determining 802 IM capabilities for control symbols, and transmitting 804 information about the determined IM capabilities to a network node. Optionally the method may include that a request for information about IM capabilities is received 801 from the network node such that the information about IM capabilities can be transmitted 804 on demand. The determining 802 of the IM capabilities may be performed once for static interference mitigation capabilities. The determining of the interference mitigation capabilities may be performed upon an IM capabilities determination event, which for example may be when the communication device has determined any change which has impact on the interference mitigation capabilities, a periodically interference mitigation capabilities determination event, an occasion where the communication device is to send uplink feedback information or upon receiving 801 the request from a network node to transmit interference mitigation capabilities, or any combination thereof. The transmitting 804 of the information about the determined IM capabilities may comprise transmitting the information in a higher layer signalling, e.g. via an RRC message or a MAC message. The transmitting 804 of the information about the determined IM capabilities may comprises use, for indicating the information related to the determined parameter for per carrier to the network node, for example unused bits, unused code words, unused fields, control space, bit pattern or bit combinations, or any combination thereof. The unused bits may be any set of available bits in an uplink control channel that are not used for indication about any uplink transmission parameters.

The communication device may capable of an IM algorithm selection method as demonstrated above. This per se may be considered a particular IM capability. The transmitting 804 of information about the determined IM capabilities may thus include receiving information about the communication device's capabilities in that sense.

Figure 10:
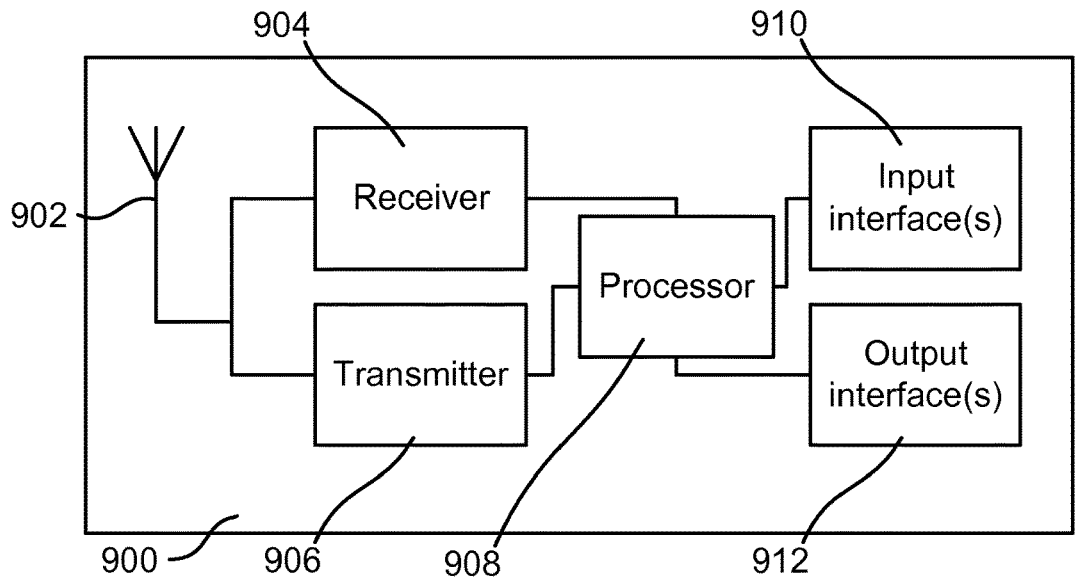
FIG. 10 is a block diagram schematically illustrating a communication device according to an embodiment.

FIG. 10 is a block diagram schematically illustrating a communication device 900 according to an embodiment. The communication device, e.g. a UE, comprises an antenna arrangement 902, a receiver 904 connected to the antenna arrangement 902, a transmitter 906 connected to the antenna arrangement 902, a processing element 908 which may comprise one or more circuits, one or more input interfaces 910 and one or more output interfaces 912. The interfaces 910, 912 can be user interfaces and/or signal interfaces, e.g. electrical or optical. The UE 900 is arranged to operate in a cellular communication network. In particular, by the processing element 908 being arranged to perform the embodiments demonstrated above and with reference to FIG. 9, the UE 900 is capable of efficiently operating in a cellular communication network and receive control signals potentially applying IM algorithms, and thus determine and report that to a network node as demonstrated above. The processing element 908 can also fulfill a multitude of tasks, ranging from signal processing to enable reception and transmission since it is connected to the receiver 904 and transmitter 906, executing applications, controlling the interfaces 910, 912, etc. The similarities with FIG. 4 should be noted, which emphasizes the ability to combine the method demonstrated with reference to FIG. 9 with any of the methods demonstrated with reference to FIGS. 1 to 3.

Figure 11:
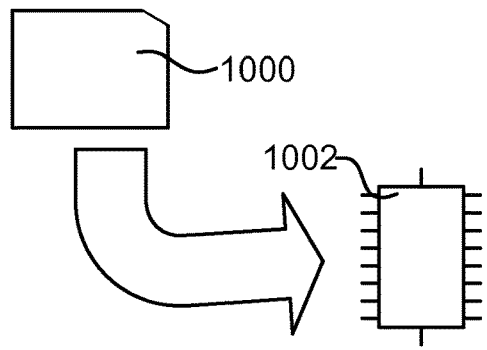
FIG. 11 schematically illustrates a computer-readable medium and a processing device.

The methods demonstrated above are suitable for implementation with aid of processing means, such as computers and/or processors, especially for the case where the processing element 908 demonstrated above comprises a processor handling IM. Therefore, there is provided computer programs, comprising instructions arranged to cause the processing means, processor, or computer to perform the steps of any of the methods according to any of the embodiments described with reference to FIGS. 1 to 3 and FIG. 9. The computer program preferably comprises program code which is stored on a computer readable medium 1000, as illustrated in FIG. 11, which can be loaded and executed by a processing means, processor, or computer 1002 to cause it to perform the methods, respectively, according to embodiments of the present invention, preferably as any of the embodiments described with reference to FIGS. 1 to 3 and FIG. 9. The processor 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and processor 1002 in FIG. 11 should be construed to be for illustrative purposes only to provide understanding of the principle, and not to be construed as any direct illustration of the elements.

As stated above, this disclosure is made in the context of LTE to provide the reader a tangible context, but the skilled reader will readily see the analogy with other technologies, where applicable. Some of the embodiments may be applicable to legacy specifications of a communication standard, while other embodiments are intended for feasible developments of the specifications. A discussion will be provided below regarding some features in this sense.

Regarding UE capability and signalling for control channels interference mitigation, the objectives to specify control channel requirements with advanced receivers with capability to mitigate interference from neighbouring cells may be considered. For the assistant signalling, on the CRS assistant information, may be such that CRS assistant information (CRS-AssistanceInfo IE) from Rel-11 can be reused without additional signalling and network restriction. It may be contemplated how to reuse the CRS assistant information and also how to define UE capability for the feature of mitigating interference for control channels. The signalling related issue includes two directions: the eNB to UE signalling as the RRC configuration and the UE to eNB signalling as the UE capability.

A consideration may thus be how to reuse CRS assistant information. The CRS assistant information from Rel-11 may be reused for this, but with the CRS-AssistanceInfo IE defined only for ABS subframe as following from 3GPP TS 36.331, v. 13.0.0.

Regarding neighCellsCRS-Info, this field contains assistance information, concerning the primary frequency, used by the UE to mitigate interference from CRS while performing RRM/RLM/CSI measurement or data demodulation. When the received CRS assistance information is for a cell with CRS colliding with that of the CRS of the cell to measure, the UE may use the CRS assistance information to mitigate CRS interference, as specified in 3GPP TS 36.101, on the subframes indicated by measSubframePatternPCell, measSubframePatternConfigNeigh, csi-MeasSubframeSet1 if configured, and the CSI subframe is set to 1 if csi-MeasSubframeSets-r12 is configured. Furthermore, the UE may use CRS assistance information to mitigate CRS interference from the cells in the IE for the demodulation purpose as specified in 3GPP TS 36.101. EUTRAN does not configure neighCellsCRS-Info-r11 if eimta-MainConfigPCell-r12 is configured.

CRS-AssistanceInfoList-r11 may be set to SEQUENCE (SIZE (1 . . . maxCellReport)) OF CRS-AssistanceInfo-r11, CRS-AssistanceInfo-r11 may be set to SEQUENCE {physCellId-r11, PhysCellId, antennaPortsCount-r11, ENUMERATED {an1, an2, an4, spare1}, mbsfn-SubframeConfigList-r11, MBSFN-SubframeConfigList, . . . }.

Moreover, CRS-IM may be considered with intention to extend such CRS assistant information to not only PCells but also SCells with not only ABS subframes, but all normal subframes, in order to better adapt to the homogeneous network as a more general deployment scenario, as proposed in 3GPP contribution R4-156406, "LS on the modification of CRS assistance information for CRS interference mitigation" by Ericsson.

From the deployment scenario perspective, it may be more beneficial to follow the CRS-IM proposal on how to reuse the CRS assistant information, other than simply reuse it from Re-11. Here, it is suggested to reuse this CRS assistant information instead of as in 3GPP Rel-11, in order to better adapt the general deployment scenarios.

As indicated in 3GPP contribution R4-155916, "Discussions on different candidate receivers for control channels interference mitigation", by Ericsson, different receiver types provide different performance and it is feasible to not use CRS-IC but still with good performance to mitigate the interference on control channels. The CRS-IC is not necessary to be mandatory features for general homogeneous network deployment, so in case no CRS-IC assistant information is sent, the control channel performance still can be improved without the usage of CRS-IC.

It is further suggested that, without CRS assistant information, the UE with capability to mitigate the interference for control channels should be still able to achieve the goal to get much better performance than legacy MMSE-MRC receiver.

For the UE with capability to mitigate interference on control channels it is beneficial for the UE to indicate such capability to the network so that eNB could use such information to better adjust the power level for control channels or the aggregation level, CFI etc. to improve capacity and system throughput in general, even though such feature can be considered as an optional feature.

It is suggested to define control channel interference mitigation as an optional feature and define UE capability signalling to indicate if such interference mitigation can be supported by the UE or not. When it comes to realization on how to define the signalling as the sub-feature, there are different options. A first option is that one general capability is used to indicate the interference mitigation for all control channels per Component Carrier (CC). A second option is that separated capabilities are used to indicate the interference mitigation for each control channels per CC. Both options have pros and cons, e.g. the first option has the least overhead but without the possibility to adjust different control channels and the second option has more flexibilities but with more system overhead. It may be good enough to take the first option with one general capability to indicate the feature in general for all control channels.

It is further suggested to take the first option with one general capability to indicate the feature for all control channels per CC.

Different candidate receivers for control channels interference mitigation are here discussed. The candidate advanced receivers to be considered for demodulation requirements are the legacy PDSCH receiver structures defined in 3GPP Rel-11/Rel-12, with capability of linear suppression of control channel interference of interfering cells, such as MMSE-IRC, E-MMSE-IRC, and cancellation of CRS interference of interfering cell. Identification of the scenarios and evaluation assumptions, including the reference receiver(s) for defining performance requirements depending on the gain for each of the control channels listed below, may be considered. Specification may be considered on the following: requirements on demodulation of PCFICH/PDCCH/PHICH with above identified advanced receivers; requirements on demodulation of EPDCCH with above identified advanced receiver with capability of MMSE-IRC and CRS-IC; and requirements on demodulation of PHICH with above identified advanced receivers. Realistic interference models for the downlink control channels may be considered. CRS assistant information (CRS-AssistanceInfo IE) from 3GPP Rel-11 may be reused without additional signalling and network restriction. Different receiver types for different test configurations and deployment scenarios for different control channels and provide 1st-step evaluation results may be considered.

Different control channels may stand for different properties in terms of interference mitigation. PDCCH/PCFICH/PHICH and CRS are spread in time and frequency domain. Furthermore, PDCCH and PCFICH are modulated in QPSK as an Alamouti pair for each RE pair with Tx diversity. PHICH is instead using BPSK as modulation order. Such Tx diversity may be explored by E-LMMSE-IRC for a better performance.

A random interference model with NC PDCCH load as 100% may be used for simulation, where blind receiver of Symbol Level Interference Cancellation (SLIC) may be used as Network Assisted Interference Cancellation and Suppression (NAICS) receiver compared to baseline IRC receiver. CFI and time and frequency offsets may be set according to legacy. 6% Tx EVM may be assumed for all tests.

The MMSE-IRC receiver may be defined from Rel-11 for PDSCH in 3GPP TS 36.101, v. 13.1.0 already and taken as well known and mature UE implementation to mitigate interference for neighbouring cells, which calculate the noise and interference covariance matrix with both diagonal and non-diagonal elements instead of only diagonal for MMSE-MRC. Such receiver type can be easily extended from PDSCH to control channels without much more complexity from UE side.

Enhanced LMMSE-IRC (E-LMMSE-IRC) is firstly discussed under NAICS SI with descriptions as following in 3GPP TR 36.866, v. 12.0.1, where MMSE-IRC explicitly considers interferer channel estimates and other interferer knowledge. Interference parameters that can enable interferer channel estimation are needed, including, for example, its DMRS or CRS with PMI/RI. No clear definition on such more advanced linear receiver, except considering the interferer channel estimations and so on, are provided, wherein there could be different understanding of such type of receiver depending on different conditions with different complexity from UE implementation. So by taking the assumption as defined above the E-IRC can be extended to different receiver types. For parametric MMSE-IRC over one RE (EIRC1), the UE may estimate the neighbouring cells channels and may, from the estimates, build up the interference and noise covariance matrix. The matrix should then reflect the interference structure seen over one RE. Parametric MMSE-IRC over two REs (EIRC2) is similar, but the matrix becomes twice as large, since it should reflect the interference structure seen over two REs. The interference matrix in this case should capture that the same modulation symbols are transmitted over two REs. This receiver can take advantage of the dependency between REs that is the results of the Alamouti transmission. Parametric MMSE-IRC over three REs (EIRC3) is similar, but the matrix becomes three times as large since it should reflect the interference structure seen over three REs. The interference matrix in this case should capture that the same modulation symbols are transmitted over two REs plus one RE which contain CRS. This receiver can take advantage of the dependency between REs that is the results of the Alamouti transmission in case of non-colliding CRS between SC and NC. In this case the dependency will cover three REs. Parametric MMSE-IRC over four or six REs (EIRC4) is similar, but the matrix becomes four or six times as large since it should reflect the interference structure seen over four or six REs. This is needed when either SC or NC has four CRS ports and the other has two CRS ports. In this case the dependency between REs is spread over four or six REs, and is four REs when colliding CRS and six when non-colliding CRS. CRS-IC is firstly introduced since Rel-11 for FeICIC scenario with requirements specified in 3GPP TS 36.101, v. 13.1.0, but there is also an item in 3GPP submission RP-142263, "CRS Interference Mitigation for LTE Homogenous Deployments", by Ericsson, with the goal to define proper requirements of using CRS-IC under homogeneous network as more typical deployment scenarios. Combinations of different receiver types may be considered. CRS-IC can be combined with MMSE-IRC or E-LMMSE-IRC receiver when the CRS-assistance-info is provided. If CRS assistance info is not provided by the network side, it may be that CRS-IC is not applied to the combination of other receiver types. Moreover, the CRS assistance info is discussed in more detail in 3GPP contribution R4-155920, "UE capability and signalling related for control channels interference mitigation", by Ericsson.

Figure 12:
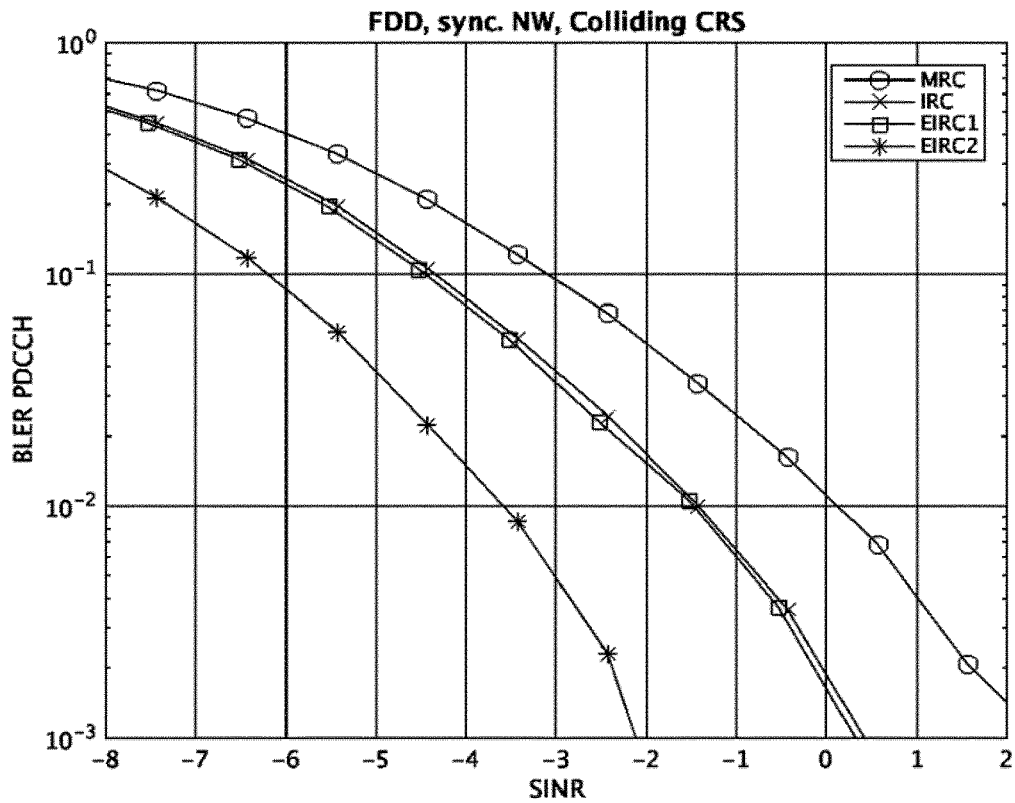
FIGS. 12 to 14 are diagrams from simulations under different conditions.
Figure 13:
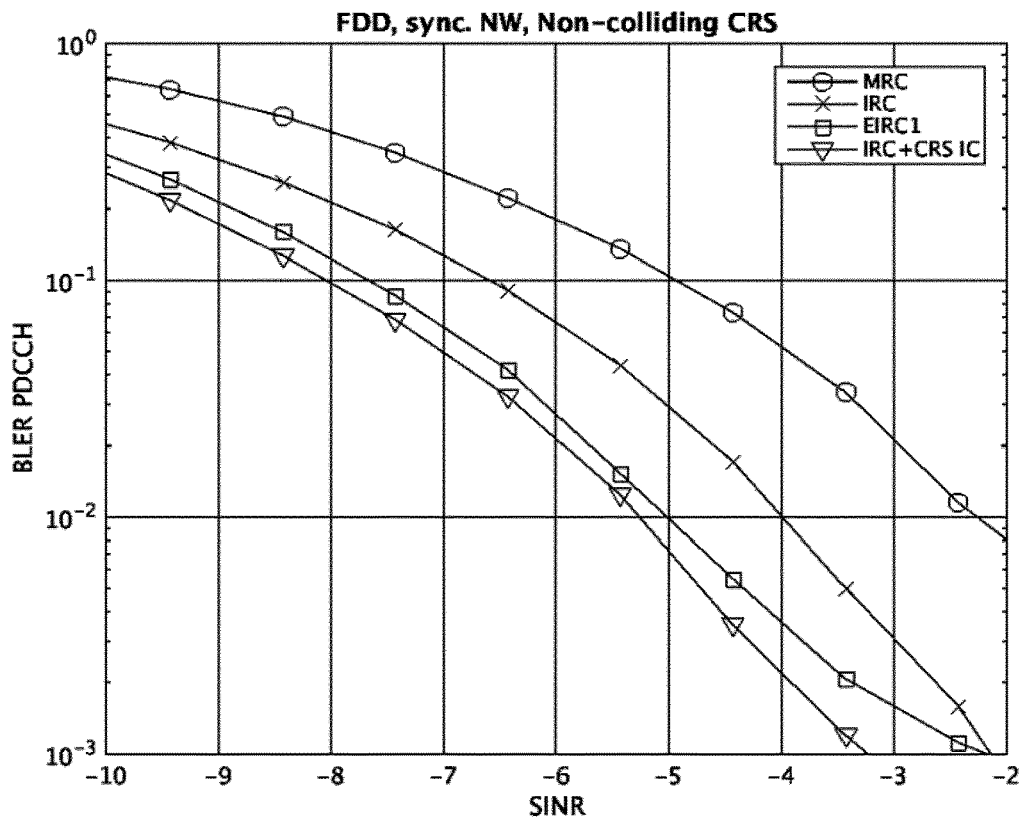
Figure 14:
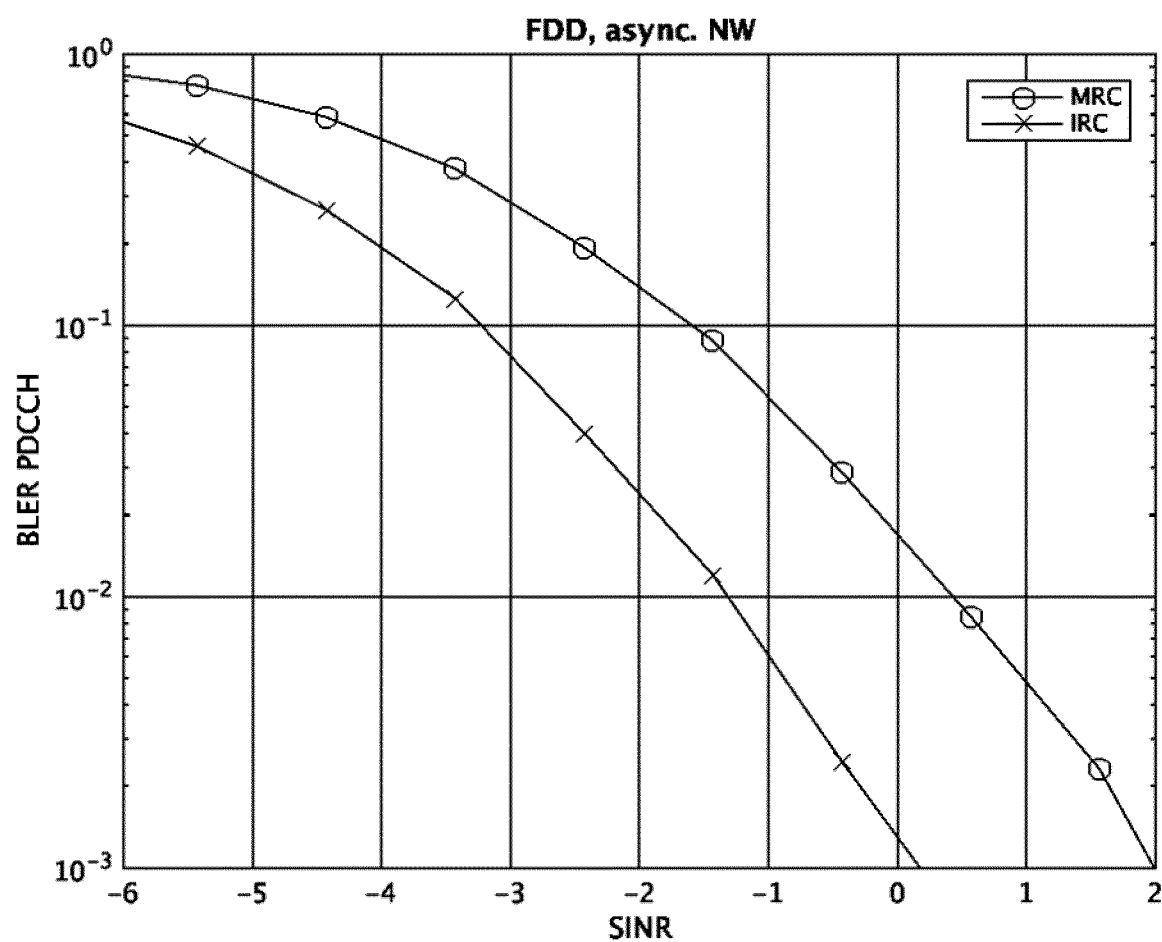

FIGS. 12 to 14 are diagrams from simulations under different conditions. FIG. 12 illustrates a diagram for a simulation for FDD in a synchronized network and colliding CRS. FIG. 13 illustrates a diagram for a simulation for FDD in a synchronized network and non-colliding CRS. FIG. 14 illustrates a diagram for a simulation for FDD in an asynchronous network.

Upon any simulations, which may be performed as suggested above, some observations may be made for PDCCH/PCFICH. A first observation may be that for non-colliding CRS, EIRC3 likely gives the best performance with ideal channel estimation, but similar performance with EIRC1 with CRS-IC and practical channel estimation with sufficient gain compared to a MRC receiver. A second observation may be that for non-colliding CRS, EIRC1 likely gives the best performance without CRS-IC and practical channel estimation with sufficient gain compared to the MRC receiver. A third observation may be that for colliding-CRS, EIRC2 gives the best performance under all conditions, with no need of CRS-IC and sufficient gain compared to the MRC receiver. A fourth observation may be that for non-colliding CRS, the iterative channel estimation can further improve the performance. Also, as analysed in 3GPP contribution R4-155919, "Test list with scenarios and scopes for control channels interference mitigation", by Ericsson, EIRC only works fine for synchronous network with timing aligned within CP length; however asynchronous network could still be considered with MMSE-IRC. A fifth observation may be that MMSE-IRC may be considered for asynchronous network. Based hereon, an algorithm flow corresponding to what is demonstrated with reference to FIG. 3 is suggested for different receiver type choice for PDCCH/PCFICH. For PHICH it uses BPSK, so either EIRC1 with or without CRS-IC may be applied for PHICH if it is a synchronous network and MMSE-IRC may be used for asynchronous network. EIRC1 with and without CRS-IC may be used under synchronous network and MMSE-IRC may be used for asynchronous network for PHICH. For ePDCCH, as the interference may vary a lot as discussed in 3GPP contribution R4-155917, "Consideration on interference model for control channels interference mitigation", by Ericsson, it may be difficult to apply a more Tx diversity aware type of E-LMMSE-IRC receiver, so it is suggested to use MMSE-IRC with or without CRS-IC for ePDCCH, with results shown in 3GPP contribution R4-155918, "Performance results for different receiver types on different control channels", by Ericsson, when there is sufficient gain. It is suggested to use MMSE-IRC with or without CRS-IC for ePDCCH.

Considering an interference model for control channels interference mitigation, e.g. as of the 3GPP contribution RP-151107, "New WI proposal: Interference mitigation for downlink control channels of LTE", by Intel, an objective to be fulfilled may be realistic interference models for the downlink control channels.

The interference model for PDCCH/PCFICH/PHICH can focus on the first three OFDM symbols for a 10 MHz bandwidth. The following items may be considered when designing the interference model: Number of interfering cells, Timing and frequency offset impact, Interference properties, CFI for both SC and NC, NCs load, and Power level for different UEs in NCs.

Regarding number of interfering cells, it has been suggested to reuse the NAICS scenarios with high INR on two NCs from 3GPP contribution R4-155919, "Test list with scenarios and scopes for control channels interference mitigation", by Ericsson. With such test scenarios to be considered, there is no need for any further system level evaluation to confirm the deployment scenarios. From link level, the performance impact of different receiver type for one or two NCs, it can be confirmed that with two NCs considered with NAICS scenarios reused, there are still sufficient gain observed. It is therefore suggested to keep two NCs with NAICS scenario reused with high INR.

Regarding timing and frequency offset impact, it is suggested to reuse the NAICS scenarios with same time and frequency offsets on two NCs from the 3GPP contribution R4-155919. From link level, the performance impact of different receiver type for such timing and frequency offsets, it can be confirmed that with two NCs considered with timing and frequency offsets from NAICS scenarios reused, there are still sufficient gain observed. It is therefore suggested to keep same timing and frequency offsets from NAICS scenarios on two NCs.

Regarding interference properties, the interference for PDCCH/PCFICH/PHICH can vary a lot depending on different conditions. Basically it can be partitioned by the following two cases: CFI is aligned between SC and NC, and CFI is not aligned between SC and NC, or asynchronous network, or cross carrier scheduling Regarding the case when CFI is aligned between SC and NC from SC point of view, the PDCCH may be corrupted by various components from NCs, assuming synchronized cells. That is, Symbol 0: PCFICH, PHICH, PDCCH, CRS, Symbol 1: PHICH, PDCCH, ePDCCH, PDSCH, CRS, Symbol 2: PHICH, PDCCH, ePDCCH, PDSCH (, DMRS), and Symbol 3: PDCCH, ePDCCH, PDSCH (, DMRS)

Considering such interference properties, depending on if it's colliding or non-colliding CRS different receiver types, may be considered according to 3GPP contribution R4-155916, "Discussions on different candidate receivers for control channels interference mitigation", by Ericsson, in order to get better performance.

Regarding the case when CFI is not aligned between SC and NC, or asynchronous network, or cross carrier scheduling, the SC PDCCH can be also interfered by PDSCH. Then, for such PDSCH type of interference, it may require more information, e.g. similar to NAICS in 3GPP Rel-12, for a proper interference mitigation such as E-LMMSE IRC where only CRS-assistance-info is reused without any other further assistant signalling.

Such conditions may be considered as typical and useful scenarios where MMSE-IRC can be considered whenever PDSCH is an interferer. It is therefore suggested to only consider aligned CFI case for E-LMMSE-IRC receiver and MMSE-IRC receiver for case whenever PDSCH is an interferer. For the PDSCH interference case, also in order to simplify the test configuration, it should be good enough to model an asynchronous network with full load and with CFI not aligned, e.g. CFI=3 on SC and CFI=1 on NCs with timing offsets as ⅓ and ⅔ subframes for two NCs.

It is also suggested to model PDSCH interference, as asynchronous network with full load and with CFI not aligned, e.g. CFI=3 on SC and CFI=1 on NCs with timing offsets as ⅓ and ⅔ subframes for two NCs, for MMSE-IRC receiver performance requirement.

Regarding the case with CFI for both SC and NC, as analysis and results show in R4-155916 for non-colliding CRS, the interference property is different in OFDM symbol with index 0 than the rest two OFDM symbols, and for colliding CRS the interference property is then always the same on all possible OFDM symbol indexes. It is therefore suggested, in order to keep the performance focused on one type of receiver, to use CFI=1 for non-colliding CRS case and CFI=2 for colliding CRS case for CFI aligned case between SC and NCs for E-LMMSE-IRC receiver. It is further suggested to use CFI=1 for non-colliding CRS case and CFI=2 for colliding CRS case for CFI aligned case between SC and NCs for E-LMMSE-IRC receiver.

Regarding NCs load, for SC, it is preferable to decide the Aggregation Level (AL) so certain level of coding rate is fixed, while for NCs, it is preferable to consider the load when it comes to interference mitigation. One possibility is to consider full load, e.g. as specified for NAICS. The benefits of such full load NC model are that the test configuration is simplified to simply reuse the NAICS interference model on control channels, it reflects, with full load on NC for control channels, the realistic condition when many users are presented in the NCs, and there is, with full load, more sufficient gain by the more advanced receivers to mitigate interference, i.e. easier to specify performance requirements. Full load modelling is therefore beneficial. It is therefore suggested to consider full load on NCs on control channels by reusing NAICS test configuration. However, considering the real network, the load varies a lot, i.e. very often the case is that there is partial load on NCs. The benefits of such partial load NC models are that partial load provides the general overview on how many users that are presented in the NCs, which may better reflect the practical network operation, and there will be more performance gain under partial load when CRS-IC is used. It is therefore suggested to take such partial load modelling into consideration, i.e. partial load on NCs on control channels, at least for non-colliding CRS case. One more clarification on the definition of partial load may be to assume same number of load on both NCs, but the RE allocation may be random, as long as being consistent, e.g. 30% load means 30% PDCCH on both NCs and PCFICH is always presented together with CRS on both NCs. Other options may be considered, e.g. with more complex setup.

Regarding power level for different UEs in NCs, for different control channels, the eNB can actually vary the power level to better adjust the system performance which is taken as a general feature from eNB. One example case to be studied may be assuming three UEs on first dominant NC with power level as 0 dB for all, and assuming three UEs on first dominant NC with power level as −3, 0, 3 dB for each, by comparing the performance difference by different power levels for different UEs on NC with full load. It is therefore suggested to study the impact of different power levels for different UEs on the NCs interference modelling as the example above.

For ePDCCH and its interference model, MMSE-IRC may be considered with or without CRS-IC as the reference receiver to mitigate the interference. So full load PDSCH interference may be considered when no CRS-IC is used and zero load PDSCH interference may be considered when CRS-IC is used. It is therefore suggested, for ePDCCH interference model, to consider full load PDSCH interference when no CRS-IC is used and zero load PDSCH interference when CRS-IC is used.

Performance results for different receiver types on different control channels may be acquired by applying the teachings above. From this, simulation results in BLER vs SINR for ePDCCH for both distributed and localized TM, with colliding and non-colliding CRS, and full load PDSCH interference and two NCs with high INR may be acquired, which may be considered for ePDCCH with MMSE-IRC, with sufficient gain observed.

An overall picture with test scenarios that may be specified for different control channels are given below with test lists proposed. The general test scenarios for control channels e.g. PDCCH/PCFICH may focus on the homogeneous network as more commonly deployed scenarios. It is therefore suggested that targeted scenarios for control channel interference mitigation should be homogeneous network as common deployment scenarios. Based on this suggestion and also analysis from 3GPP contribution R4-155916, "Discussions on different candidate receivers for control channels interference mitigation", by Ericsson, the tests may focus on the test configuration with Tx diversity with either 2Tx or 4Tx cases, considering 3GPP contribution R4-155909, "Test coverage and applicability rules for 4Rx capable UEs for demodulation and RRM tests", by Ericsson, as the existing tests for PDCCH/PCFICH.

For transmit diversity performance, minimum requirement for two Tx Antenna Port, and the average probability of a missed downlink scheduling grant (Pm-dsg) may be as the specified value in Table 1.

TABLE 1

Minimum performance PDCCH/PCFICH

| Test number | Bandwidth | Aggregation level | Reference Channel | OCNG Pattern | Propagation Condition | Antenna configuration and correlation Matrix | Reference value Pm-dsg (%) | SNR (dB) |
|---|---|---|---|---|---|---|---|---|
| 1 | 10 MHz | 4 CCE | R.16 FDD | OP.1 FDD | EVA70 | 2 × 2 Low | 1 | −0.6 |

For corresponding minimum requirement for four Tx Antenna Port, the average probability of a missed downlink scheduling grant (Pm-dsg) may be as the specified value in Table 2.

TABLE 2

Minimum performance PDCCH/PCFICH

| Test number | Bandwidth | Aggregation level | Reference Channel | OCNG Pattern | Propagation Condition | Antenna configuration and correlation Matrix | Reference value Pm-dsg (%) | SNR (dB) |
|---|---|---|---|---|---|---|---|---|
| 1 | 5 MHz | 2 CCE | R.17 FDD | OP.1 FDD | EPA5 | 4 × 2 Medium | 1 | 6.3 |

Similarly, the baseline test scenario for PHICH is listed below as following. It should be good enough to only focus on 2Tx for PHICH. The average probability of a miss-detecting ACK for NACK (Pm-an) may be below the specified value in Table 3.

TABLE 3

Minimum performance PHICH

| Test number | Bandwidth | Reference Channel | OCNG Pattern | Propagation Condition | Antenna configuration and correlation Matrix | Reference value Pm-an (%) | SNR (dB) |
|---|---|---|---|---|---|---|---|
| 1 | 10 MHz | R.19 | OP.1 FDD | EVA70 | 2 × 2 Low | 0.1 | 4.4 |

Note 1:
Test case applicability is defined in 8.1.2.1.

It is suggested to reuse existing tests with Tx diversity with 2Tx and 4Tx for PDCCH/PCFICH and with 2Tx for PHICH.

Based on the simulation results from 3GPP contribution R4-155918, "Performance results for different receiver types on different control channels", by Ericsson, it is preferred to focus on the SINR level targeted at cell edge so the following baseline test scenarios are proposed for both distributed and localized scenarios for ePDCCH.

TABLE 4

Minimum performance Distributed EPDCCH

| Test number | Bandwidth | Aggregation level | Reference Channel | OCNG Pattern | Propagation Condition | Antenna configuration and correlation Matrix | Reference value Pm-dsg (%) | SNR (dB) |
|---|---|---|---|---|---|---|---|---|
| 1 | 10 MHz | 4 ECCE | R.55 FDD | OP.7 FDD | EVA5 | 2 × 2 Low | 1 | 2.60 |

TABLE 5

Minimum performance Localized EPDCCH with TM9

| Test number | Bandwidth | Aggregation level | Reference Channel | OCNG Pattern | Propagation Condition | Antenna configuration and correlation Matrix | Reference value Pm-dsg (%) | SNR (dB) |
|---|---|---|---|---|---|---|---|---|
| 2 | 10 MHZ | 8 ECCE | R.58 FDD | OP.7 FDD | EVA5 | 2 × 2 Low | 1 | 2.5 |

It is suggested to reuse existing test scenarios for ePDCCH on distributed and localized transmission targeting at cell edge SINR.

On top, the interference may be added as neighbouring cells. There are two options to reuse the legacy conditions:

NAICS scenario with two interfering cells, and high INR ($\hat{E}_s/N_{oc}$(dB), 13.91, 3.34)

IRC scenarios with two interfering cells, Dominant Interference Proportion (DIP).

It is preferred to reuse NAICS scenarios with high INR since, for IRC work, it has been observed that the interference level is rather low with the DIP values as defined in earlier specifications. It is therefore suggested to reuse NAICS test scenarios with two interfering cells and high INR for control channel interference mitigation requirements.

For control channels it is preferred to have good test coverage for all typical network deployments, including both synchronous and asynchronous networks. It is therefore suggested that both synchronous and asynchronous network should be considered. For synchronous network, it is straightforward to also reuse the same test configuration with timing and frequency offsets from NAICS, considering the suggestion related to NAICS above, as of Table 6.

TABLE 6

Timing and frequency offsets for NAICS test scenario

|  |  | SC | NC1 | NC2 |
|---|---|---|---|---|
| Time offset to cell 1 | us | N/A | 2 | 3 |
| Frequency offset to cell 1 | Hz | N/A | 200 | 300 |

It is therefore suggested to reuse NAICS test scenarios with time and frequency offsets for synchronous network as above. For homogeneous network in FDD the asynchronous network is also taken as typical deployment scenarios. Though EIRC may not perform well under asynchronous network when the timing is not aligned within CP length, there is still possibility to consider other advanced receiver type to mitigate interference for asynchronous network, e.g. MMSE-IRC receiver has been proved to be more robust with asynchronous timing for FDD scenarios, with same timing offsets defined for IRC PDSCH demodulation as ⅓ and ⅔ subframes for the two NCs. It is therefore suggested to consider at least one PDCCH/PCFICH test under asynchronous network with MMSE-IRC with ⅓ and ⅔ subframes as timing offset for the two NCs.

For the same reason, i.e. for good test coverage, it is preferred that both colliding and non-colliding CRS test cases are considered. Also with results shown in the 3GPP contributions R4-155916, "Discussions on different candidate receivers for control channels interference mitigation", and R4-155918, "Performance results for different receiver types on different control channels", both by Ericsson, there are good performance gain observed for both conditions which further proves the benefit of introducing the test cases for both conditions. It is therefore suggested that both colliding and non-colliding CRS test cases should be considered.

When it comes to definition of colliding and non-colliding CRS, the same test configurations as demonstrated for NAICS above may be reused, e.g. colliding means that the first dominant interfering cell is taken as colliding then the second dominant interfering cell is taken as non-colliding. The similar case may apply for non-colliding CRS. It is therefore suggested to reuse NAICS test scenarios on colliding and non-colliding CRS test configurations.

As stated in 3GPP contributions R4-155916, referred to above, and R4-155920, "UE capability and signalling related for control channels interference mitigation", by Ericsson, it is feasible for the UE to still achieve good performance, i.e. better than legacy receiver without such CRS assistant information, no matter whether such content coming from Rel-11 FeICIC or Rel-13 CRS-IM. So it is preferred to keep the UE with such capability to achieve the gain even without CRS-assistance info. It is therefore suggested to define tests with advanced receiver performance without CRS-assistant info.

An interference model is proposed in 3GPP contribution R4-155917, "Consideration on interference model for control channels interference mitigation", by Ericsson, together with the test lists listed below as Tables 7 to 9. It is suggested that these are considered for the overall test lists for all required control channels.

TABLE 7

Test list for PDCCH/PCFICH

| Test number | Bandwidth | Aggregation level | Reference Channel | Propagation Condition | Antenna configuration and correlation Matrix | Colliding CRS/Non-colliding CRS | Synchronous network/ Asynchronous network | W/wo CRS assistant information | FDD/ TDD | NC load |
|---|---|---|---|---|---|---|---|---|---|---|
| 1 | 10 MHz | 4 CCE | R.16 | EVA70 | 2 × 2 Low | Colliding | Sync | With/Without | Both | 100% |

TABLE 7-continued

Test list for PDCCH/PCFICH

| Test number | Bandwidth | Aggregation level | Reference Channel | Propagation Condition | Antenna configuration and correlation Matrix | Colliding CRS/Non-colliding CRS | Synchronous network/ Asynchronous network | W/wo CRS assistant information | FDD/ TDD | NC load |
|---|---|---|---|---|---|---|---|---|---|---|
| 2 | 10 MHz | 4 CCE | R.16 | EVA70 | 2 × 2 Low | Non-colliding | Sync | With | Both | 30%, 100% |
| 3 | 10 MHz | 4 CCE | R.16 | EVA70 | 2 × 2 Low | Non-colliding | Sync | Without | Both | 100% |
| 4 | 10 MHz | 4 CCE | R.16 | EVA70 | 2 × 2 Low | Colliding | Async | Without | FDD | 100% |
| 5 | 10 MHz | 4 CCE | R.16 | EVA70 | 2 × 2 Low | Non-colliding | Async | Without | FDD | 100% |
| 6 | 5 MHz | 2 CCE | R.17 | EPA5 | 4 × 2 Medium | Non-colliding | Sync | With | Both | 30%, 100% |

Note 1:
For Test 6 it's possible to consider 4 × 2 on SC and 2 × 2 on NCs in order to reduce the number of faders for the testing cost.

TABLE 8

Test list for PHICH

| Test number | Bandwidth | Reference Channel | Propagation Condition | Antenna configuration and correlation Matrix | Colliding CRS/ Non-colliding CRS | Synchronous network/ Asynchronous network | W/wo CRS assistant information | FDD/ TDD | NC load |
|---|---|---|---|---|---|---|---|---|---|
| 1 | 10 MHz | R.19 | EVA70 | 2 × 2 Low | Colliding | Sync | With/Without | Both | 100% |
| 2 | 10 MHz | R.19 | EVA70 | 2 × 2 Low | Non-colliding | Sync | With | Both | 30%, 100% |
| 3 | 10 MHz | R.19 | EVA70 | 2 × 2 Low | Colliding | Async | Without | FDD | 100% |
| 4 | 10 MHz | R.19 | EVA70 | 2 × 2 Low | Non-colliding | Async | Without | FDD | 100% |

TABLE 9

Test list for ePDCCH

| Test number | Bandwidth | Aggregation level | Reference Channel | Propagation Condition | Antenna configuration and correlation Matrix | Localized/ Distributed | Colliding CRS/ Non-colliding CRS | Synchronous network/ Asynchronous network | W/wo CRS assistant information | FDD/ TDD | NC load |
|---|---|---|---|---|---|---|---|---|---|---|---|
| 1 | 10 MHz | 4 ECCE | R.55 FDD | EVA5 | 2 × 2 Low | Distributed | Colliding | Sync | With/Without | Both | 100% |
| 2 | 10 MHz | 4 ECCE | R.55 FDD | EVA5 | 2 × 2 Low | Distributed | Non-colliding | Sync | With | Both | 0%, 100% |
| 3 | 10 MHz | 8 ECCE | R.58 FDD | 10 MHZ | 2 × 2 Low | Localized | Colliding | Sync | With/Without | Both | 100% |
| 4 | 10 MHz | 8 ECCE | R.58 FDD | 10 MHZ | 2 × 2 Low | Localized | Non-colliding | Sync | With | Both | 0%, 100% |

For the applicability rule for CC-IM capable UE it is possible to skip certain tests, but it is preferred to keep good test coverage, similar to 4Rx work as stated in 3GPP contribution R4-155909, "Test coverage and applicability rules for 4Rx capable UEs for demodulation and RRM tests", by Ericsson. It is suggested to apply the following rules to be applied for CC-IM capable UE for both legacy tests with legacy receiver and new tests with advanced receivers Rule 1: If the test scenario defined with interference modelled is with same antenna configuration in serving cell as the legacy test scenario defined with legacy receiver without any interference modelled, except SNR/SINR requirements, then only the new tests defined with interference need to be executed and the legacy tests without interference may be skipped.

Rule 2: If a test scenario defined for legacy receiver without any interference modelled does not have a corresponding new test scenario with interference modelled, the legacy tests with 2Rx need to be executed.

It is therefore suggested that Rule 1 and Rule 2 may be applied as requirements for all control channels for CC-IM capable UEs in order to achieve proper test coverage.

The invention claimed is:

1. A method performed by a communication device arranged to operate in a cellular communication system, the method comprising receiving a control symbol from a network node operating a cell of the cellular communication system and serving the communication device;

determining an interference situation for the control symbol, including whether the control symbol collides in time and frequency with corresponding control symbols associated with neighbouring interfering cells;

selecting a first interference mitigation algorithm based on determining that the control symbol collides in time and frequency;

based on determining that the control symbol does not collide in time and frequency, selecting between the first interference mitigation algorithm and at least one other interference mitigation algorithm; and performing the selected interference mitigation algorithm for the received control symbol.

2. The method of claim 1, wherein:

determining the interference situation includes determining whether neighbouring interfering cells are time aligned with the cell serving the communication device; and determining whether the control symbol collides in time and frequency is based on determining that neighbouring interfering cells are time aligned with the cell serving the communication device.

3. The method of claim 1, wherein:

determining the interference situation includes determining whether a cell-specific reference symbol assistance information is available from the network node serving the communication device; and determining whether the control symbol collides in time and frequency is based on determining that the cell-specific reference symbol assistance information is available from the network node serving the communication device.

4. The method of claim 1, wherein determining the interference situation includes determining a structure used to provide the control symbol, and wherein the determined structure includes the following:

a particular orthogonal frequency division multiplex (OFDM) symbol of a subframe; and a number of control symbol antenna ports.

5. The method of claim 4, wherein selecting between the first interference mitigation algorithm and at least one other interference mitigation algorithm comprises:

selecting a second interference mitigation algorithm if the particular OFDM symbol is a first OFDM symbol of the subframe; and selecting the first interference mitigation algorithm based on:

the particular OFDM symbol is not the first symbol or a second symbol of the subframe, and the number of control symbol antenna ports does not match a predetermined number of ports.

6. The method of claim 5, wherein selecting between the first interference mitigation algorithm and at least one other interference mitigation algorithm further comprises selecting a third interference mitigation algorithm based on:

the particular OFDM symbol is the first symbol or a second symbol of the subframe, and the number of control symbol antenna ports matches the predetermined number of ports.

7. The method of claim 1, further comprising:

determining interference mitigation capabilities for control symbols; and transmitting information about the determined interference mitigation capabilities to a network node of the cellular communication system.

8. The method of claim 7, wherein determining the interference mitigation capabilities is performed once for static interference mitigation capabilities.

9. The method of claim 7, wherein determining the interference mitigation capabilities is performed upon an interference mitigation capabilities determination event.

10. The method of claim 9, wherein the interference mitigation capabilities determination event is any one or more of the following:

determination of any change which has impact on the interference mitigation capabilities;

a periodic interference mitigation capabilities determination event;

an occasion where the communication device is configured to send uplink feedback information; and upon receiving a request from a network node to transmit interference mitigation capabilities.

11. The method of claim 7, wherein transmitting the information about the determined interference mitigation capabilities comprises transmitting the information in a higher layer signalling.

12. The method of claim 11, wherein the higher layer signalling comprises one of: an RRC message to the network node; and a MAC message.

13. The method of claim 7, wherein:

the interference mitigation capabilities for control symbols are determined for each of a plurality of carriers;

the information about the determined interference mitigation capabilities is indicated, for each of the plurality of carriers, by using one or more of the following:

unused bits;

unused code words; and unused fields, control space, bit pattern, or bit combinations.

14. The method of claim 13, wherein the unused bits comprise any set of available bits in an uplink control channel that are not used for indication about uplink transmission parameters.

15. A communication device arranged to operate in a cellular communication system comprising a cell operated by a network node serving the communication device, wherein the communication device comprises:

at least one processor; and at least one computer-readable medium storing computer-executable instructions that, when executed by the at least one processor, configure the communication device to:

receive a control symbol from the network node;

determine an interference situation for the control symbol, including whether the control symbol collides in time and frequency with corresponding control symbols associated with neighbouring interfering cells;

select a first interference mitigation algorithm based on determining that the control symbol collides in time and frequency;

based on determining that the control symbol does not collide in time and frequency, select between the first interference mitigation algorithm and at least one other available interference mitigation algorithm; and perform the selected interference mitigation algorithm for the received control symbol.

16. A non-transitory, computer-readable medium storing computer-executable instructions that, when executed by at least one processor of a communication device, configure the communication device to perform operations corresponding to the method according to claim 1.

\* \* \* \* \*